(12) United States Patent
Wood

(10) Patent No.: US 7,253,794 B2
(45) Date of Patent: Aug. 7, 2007

(54) DISPLAY APPARATUS AND METHOD

(75) Inventor: Lawson A. Wood, Arlington, VA (US)

(73) Assignee: Acacia Patent Acquisition Corporation, Newport Beach, CA (US)

( * ) Notice: Subject to any disclaimer, the term of this patent is extended or adjusted under 35 U.S.C. 154(b) by 99 days.

(21) Appl. No.: 10/068,871

(22) Filed: Feb. 11, 2002

(65) Prior Publication Data

US 2002/0093477 A1 Jul. 18, 2002

Related U.S. Application Data

(63) Continuation-in-part of application No. 09/063,364, filed on Apr. 21, 1998, now Pat. No. 6,535,187, and a continuation-in-part of application No. 08/381,156, filed on Jan. 31, 1995, now Pat. No. 6,348,907.

(51) Int. Cl.
*G09G 3/34* (2006.01)

(52) U.S. Cl. .................. 345/84; 345/102; 348/771

(58) Field of Classification Search ............ 345/84–87, 345/102, 690, 692; 348/771
See application file for complete search history.

(56) References Cited

U.S. PATENT DOCUMENTS

| | | |
|---|---|---|
| 3,896,338 A | 7/1975 | Nathanson et al. |
| 3,946,433 A | 3/1976 | Kermisch |
| 4,481,531 A | 11/1984 | Warde et al. |
| 4,978,950 A | 12/1990 | Capps |
| 5,093,323 A | 3/1992 | Takeuchi et al. |
| 5,096,279 A | 3/1992 | Hornbeck et al. |

(Continued)

FOREIGN PATENT DOCUMENTS

EP 261896 3/1988

(Continued)

OTHER PUBLICATIONS

Jack M. Younce, "Mirrors On A Chip," *IEEE Spectrum* (Nov. 1993), pp. 27-31.

*Primary Examiner*—Regina Liang

(57) ABSTRACT

A display apparatus includes a spatial light modulator, such as a digital micromirror device or an LCD panel, and a lighting unit that illuminates the spatial light modulator. The lighting unit may include red, green, and blue lamps which emit light that impinges on a DMD from at least two different directions. The lamps may be flash tubes which are fired at different binary levels in accordance with the rank of the bits that are being displayed on the DMD. The lamps may be fluorescent lamps which are driven steadily at predetermined levels while the rows of micromirrors are turned on in sequence and subsequently turned off in sequence. Resetting to dislodge micromirrors that have become stuck can be accomplished by emitting current pulses through the micromirrors while exposing them to a magnetic field. The illumination unit may include a lamp unit and a color wheel. The light from the lamp unit can be integrated, and the data displayed on the spatial light modulator can be changed when the integrated light reaches a predetermined value. The color wheel may be rotated faster than the frame repetition rate of video information that is being displayed. The intensity of the light may be controlled in accordance with the bit rank or significance of the bits that are being displayed by the spatial light modulator. Several techniques for achieving different intensity levels are disclosed.

24 Claims, 27 Drawing Sheets

U.S. PATENT DOCUMENTS

| | | | |
|---|---|---|---|
| 5,122,791 A | 6/1992 | Gibbons et al. | |
| 5,128,782 A * | 7/1992 | Wood | 349/61 |
| 5,210,653 A | 5/1993 | Schell | |
| 5,231,388 A | 7/1993 | Stoltz | |
| 5,233,385 A | 8/1993 | Sampsell | |
| 5,237,340 A | 8/1993 | Nelson | |
| 5,278,652 A | 1/1994 | Urbanus et al. | |
| 5,280,277 A | 1/1994 | Hornbeck | |
| 5,365,283 A | 11/1994 | Doherty et al. | |
| 5,386,250 A | 1/1995 | Guerinot | |
| 5,386,253 A | 1/1995 | Fielding | |
| 5,416,496 A | 5/1995 | Wood | |
| 5,448,314 A | 9/1995 | Heimbuch et al. | |
| 5,452,024 A | 9/1995 | Sampsell | |
| 5,459,610 A | 10/1995 | Bloom et al. | |
| 5,467,146 A | 11/1995 | Huang et al. | |
| 5,479,289 A | 12/1995 | Fisli | |
| 5,528,317 A | 6/1996 | Gove et al. | |
| 5,592,188 A | 1/1997 | Doherty et al. | |
| 5,619,228 A | 4/1997 | Doherty | |
| 5,623,281 A | 4/1997 | Markandey et al. | |
| 5,625,424 A | 4/1997 | Conner et al. | |
| 5,640,214 A * | 6/1997 | Florence | 348/743 |
| 5,650,832 A | 7/1997 | Poradish et al. | |
| 5,657,099 A | 8/1997 | Doherty et al. | |
| 5,668,572 A | 9/1997 | Meyer et al. | |
| 5,668,611 A | 9/1997 | Ernstoff et al. | |
| 5,680,180 A | 10/1997 | Huang | |
| 5,691,780 A | 11/1997 | Marshall et al. | |
| 5,706,061 A | 1/1998 | Marshall et al. | |
| 5,729,243 A | 3/1998 | Cavallerano et al. | |
| 5,737,038 A | 4/1998 | Gale et al. | |
| 5,738,429 A | 4/1998 | Tagawa et al. | |
| 5,748,164 A | 5/1998 | Handschy et al. | |
| 5,757,348 A | 5/1998 | Handschy et al. | |
| 5,774,196 A | 6/1998 | Marshall | |
| 5,777,589 A | 7/1998 | Gale et al. | |
| 5,798,743 A | 8/1998 | Bloom | |
| 5,808,800 A | 9/1998 | Handschy et al. | |
| 5,812,303 A | 9/1998 | Hewlett et al. | |
| 5,863,125 A | 1/1999 | Doany | |
| 5,903,323 A | 5/1999 | Ernstoff et al. | |
| 5,909,204 A | 6/1999 | Gale et al. | |
| 5,917,558 A | 6/1999 | Stanton | |
| 5,917,568 A | 6/1999 | Johnson et al. | |
| 5,977,942 A | 11/1999 | Walker et al. | |
| 5,986,640 A * | 11/1999 | Baldwin et al. | 345/596 |
| 5,986,721 A | 11/1999 | Jones et al. | |
| 5,995,071 A | 11/1999 | Mertz | |
| 6,002,452 A | 12/1999 | Morgan | |
| 6,008,929 A | 12/1999 | Akimoto et al. | |
| 6,064,366 A | 5/2000 | Millward et al. | |
| 6,072,452 A | 6/2000 | Worley, III et al. | |
| 6,188,379 B1 | 2/2001 | Kaneko | |
| 6,232,963 B1 | 5/2001 | Tew et al. | |
| 6,243,057 B1 | 6/2001 | Blaxtan et al. | |
| 6,243,072 B1 | 6/2001 | McKnight | |
| 6,317,112 B1 | 11/2001 | Handschy et al. | |
| 6,330,039 B2 | 12/2001 | Matsui et al. | |
| 6,348,907 B1 * | 2/2002 | Wood | 345/84 |
| 6,535,187 B1 * | 3/2003 | Wood | 345/84 |
| 6,570,550 B1 | 5/2003 | Handschy et al. | |
| 2002/0047824 A1 | 4/2002 | Handschy et al. | |
| 2002/0093477 A1 * | 7/2002 | Wood | 345/89 |

FOREIGN PATENT DOCUMENTS

| | | |
|---|---|---|
| EP | 0655724 | 5/1995 |
| EP | 0662773 | 7/1995 |
| EP | 0748128 | 12/1996 |
| EP | 0749248 | 12/1996 |
| JP | 9-044115 | 2/1997 |
| WO | WO 96/19794 | 6/1996 |

* cited by examiner

DISPLAY APPARATUS AND METHOD

CROSS-REFERENCE TO RELATED APPLICATIONS

The present patent application is a continuation-in-part of Applicant's application Ser. No. 08/381,156, filed Jan. 31, 1995 now U.S. Pat. No. 6,348,907, and a continuation-in-part of Applicant's application Ser. No. 09/063,364, filed Apr. 21, 1998 now U.S. Pat. No. 6,535,187. The disclosures of both of these parent applications are incorporated herein by reference.

It is noted that application Ser. No. 08/381,156 was filed during the pendency of Applicant's earlier application Ser. No. 08/034,694, which was filed on Mar. 19, 1993. application Ser. No. 08/034,694 was filed during the pendency of Applicant's earlier application Ser. No. 07/862,313, which was filed on Apr. 2, 1992. Application Ser. No. 07/862,313 was filed during the pendency of Applicant's earlier application Ser. No. 07/521,399, which was filed on May 10, 1990. Application Ser. No. 07/521,399) was filed during the pendency of Applicant's earlier application Ser. No. 07/396,916, which was filed on Aug. 22, 1989. The disclosures of all of these prior applications are also incorporated herein by reference.

Application Ser. No. 07/521,399 matured into U.S. Pat. No. 5,128,782, which issued on Jul. 7, 1992, and application Ser. No. 08/034,694 matured into U.S. Pat. No. 5,416,496, which issued on May 16, 1995. Application Ser. No. 07/396,916 and application Ser. No. 07/862,313 have been abandoned.

Although at the time of filing the present application, Applicant does not claim the benefit under 35 U.S.C. § 120 of application Ser. Nos. 08/034,694, 07/862,313, 07/521,399, or 07/396,916, Applicant reserves the right to claim such benefit if, at any time during the pendency of the present application at the Patent and Trademark Office or thereafter, prior art turns up which makes such a claim for the benefit of an earlier prior date desirable. At the time of filing the present application, only the benefit under 35 U.S.C. § 120 of the first two applications identified above (i.e., Ser. Nos. 08/381,156 and 09/063,364) is being claimed.

BACKGROUND OF THE INVENTION

The present invention is directed to a display apparatus which employs a spatial light modulator, such as a liquid crystal display or digital micromirror device, and to a display method.

A digital micromirror device is a spatial light modulator which employs an array of tiny mirrors, or micromirrors, whose positions can be electrically controlled in order to display an image. This technology has been developed extensively by Larry J. Hornbeck and others at Texas Instruments, Inc. of Dallas, Tex., and is described by them in a sequence of patents going back more than a decade. These developmental efforts have culminated in a digital micromirror device which includes an array of memory cells and a corresponding array of pivotable micromirrors whose positions are electrostatically adjusted by the contents of the memory cells. As is perhaps best described in U.S. Pat. No. 5,096,279 to Hornbeck et al, the array of pivotable micromirrors that cooperates with the memory cells can be made using integrated circuit fabrication techniques.

As is described in the above-identified patent, in U.S. Pat. No. 5,280,277 to Hornbeck, and in an article entitled "Mirrors on a Chip" that was published in the November, 1993 issue of *IEEE Spectrum* at pages 27–3 1 by Jack M. Younse, a negative biasing voltage is selectively applied to the micromirrors and to landing electrodes fabricated beneath them in order to obtain bistable operation of the micromirrors and simultaneous updating of the entire array of micromirrors. Sometimes the micromirrors get stuck. It is known that this problem can be cured by subjecting the micromirrors to resonant reset pulses which electrostatically dislodge any stuck micromirrors.

It is also known to make a color display using a single digital micromirror device by sequentially exposing it to red, green, and blue light impinging from a single direction. A white lamp and a color wheel can be employed for this purpose. In situations where it is economically feasible to devote three digital micromirror devices to a display, each of them can be illuminated by light of a different primary color and the resulting red, green, and blue images can then be superimposed on a screen.

Advances have also been made in other types of display apparatuses. For example U.S. Pat. No. 5,122,791 to David J. Gibbons et al discloses a ferroelectric LCD panel which is selectively backlit by red, green, and blue fluorescent tubes. The intensity or duration of the backlighting is controlled on the basis of the rank of the bits that are being displayed on the panel.

Applicant's U.S. Pat. No. 5,416,496 also employs a ferroelectric LCD that is back-lit with colored lights. The colored light may be generated in flashes whose intensity is controlled on the basis of the rank of the video information bits that are being displayed. Alternatively, instead of flashes of light, the LCD panel may be illuminated by light that is generated steadily, and whose intensity is determined by the rank of the bits that are being displayed. In the latter alternative, the pixels of the panel are turned on in accordance with the video information on a row-by-row basis, and are subsequently turned off in accordance with the same video information, again on a row-by-row basis. As a result, each pixel that is turned on and then turned off receives the same amount of light regardless of its row, so the LCD can be addressed row-by-row with video information while the LCD is being illuminated.

SUMMARY OF THE INVENTION

A primary object of the invention is to provide an improved display apparatus which employs only one digital micromirror device.

Another object of the invention is to provide a display apparatus in which a digital micromrirror device is exposed to light at different binary levels.

Yet another object of the invention is to provide a display apparatus which employs a digital micromirror device wherein the micromirrors are not updated all at once, but are instead updated on a row-by-row basis while being exposed steadily to light.

Another object of the invention is to provide a display apparatus which employs an addressable spatial light modulator that is illuminated by a lighting unit whose light output varies in intensity in accordance with the bit rank of video information that is being used to address to the spatial light modulator, with the light output of the lighting unit being monitored in order to determine when to change what is displayed on the spatial light modulator. The video information may be fed to the spatial light modulator on a frame-to-frame basis for each color, or on a row-by-row basis for each color. If the video information is fed to the spatial light modulator on a row-by-row basis, the amount of light received by different rows can be equalized, during display of a particular bit rank of video information for a particular color, by turning the pixels on row-by-row in accordance with the same video information.

Another object of the invention is to provide a display apparatus which employs a spatial light modulator that is illuminated by a lamp unit having a plurality of lamps, with the light intensity being adjusted by turning at least one of the lamps on and off.

Another object is to provide a spatial light modulator that is illuminated by a lamp unit having a single lamp that is driven at different intensities, depending on the bit rank that is being displayed. Instead of a single lamp, a plurality of lamps that are driven in unison may be used. For example, a plurality of lamps may be connected in parallel to supply more light than could be delivered by a single lamp.

A further object of the invention is to provide a spatial light modulator that is illuminated by a lamp unit which emits light with an intensity that is constant, with the intensity being controlled before the light impinges on the spatial light modulator (or after impingement on the spatial light modulator, if preferred) by passing the light through at least one attenuator. The at least one attenuator may be a plurality of rotating attenuators, possibly combined with a color wheel. Alternatively, the at least one attenuator may be a liquid crystal panel having rows that are selectively turned on in accordance with the desired light intensity, or a liquid crystal cell which is pulse-width modulated in accordance with the desired intensity.

A further object of the invention is to provide novel techniques for illuminating a spatial light modulator through a rotating color wheel. If the color wheel is rotated more than one revolution during display of a frame of video information, different bit ranks of the video information can be allocated to different revolutions. Furthermore, the most significant bits can be partially displayed during one revolution and subsequently completed during one or more additional revolutions.

A still further object of the invention is to integrate the light emitted by a lighting unit whose intensity is changed through a plurality of levels in order to control the duration of buffer periods which accommodate relatively slow changes in the light intensity or erratic light output during transitions from one level to another, the buffer periods being periods when the data displayed on the spatial light modulator is such that all of the pixels of the spatial light modulator are turned off. The buffer periods may have durations that are controlled by monitoring the light generated by the lighting unit. The buffer periods may also have fixed durations, corresponding in duration to the time needed for a color wheel to rotate completely through one or more colored sectors or through one or more complete revolutions.

In accordance with one aspect of the invention, a display apparatus includes a digital micromirror device having an array of movable micromirrors, along with exposing means for exposing them to light of a first primary color which impinges on the array from a first direction and to light of a second primary color which impinges on the array from a second direction. The first and second directions may lie in a common plane, which permits a micromirror that is ON with respect to the first primary color and OFF with respect to the second primary color when it (the micromirror) is in one of two positions to be OFF with respect to the first primary color and ON with respect to the second primary color when it (the micromirror) is in the other of the two positions. In this situation the light of the first and second primary colors impinges on the array at different times, possibly in sequences of flashes having different binary levels.

In accordance with a further aspect of the invention, a method for displaying a sequence of frames of video information on a digital micromirror device is provided. The digital micromirror device has an array of micromirrors that are disposed in rows and that are movable between a first position and a second position. The video information for a frame includes a plurality of first multi-bit video words (such as multi-bit video words for the red component of an image), and each micromirror corresponds to one of the first multi-bit video words. Furthermore, each of the first multi-bit video words includes at least a most significant bit and a least significant bit. The displaying method includes the step of moving micromirrors which correspond to first video words whose least significant bit has a predetermined value from their first positions to their second positions, the micromirrors of a first one of the rows being moved before the micromirrors of a last one of the rows. This is followed by the step of returning the micromirrors that were moved during the first step to their first positions, the micromirrors of the first row being returned before the micromirrors of the last row. The display method also includes the step of steadily exposing the micromirrors to light at a first level while the first step is conducted and while the second step is conducted. If the micromirrors are activated on a row-by-row basis when the first and second steps are performed, and if the first and second steps are conducted at the same rate, each micromirror that is moved from its first position to its second position and then back to its first position receives the same amount of light while in the second position, regardless of the micromirror's row. Consequently the micromirrors need not all be moved at once despite the steady illumination, It is noted that the micromirrors need not all be moved at once if they are illuminated in discrete flashes, either, instead of by steady exposure in accordance with this aspect of the invention.

In accordance with another aspect of the invention, a method for using a spatial light modulator can be conducted by displaying data on the spatial light modulator, shining light on the spatial light modulator, integrating the light, and changing the data displayed on the spatial light modulator when the integrated light reaches a predetermined value. The method may further include changing the intensity of the light shined on the spatial light modulator, either by using a lighting unit having a plurality of lamps and turning at least one of the lamps on and off, or by using a lighting unit having a single lamp that is driven at different energy levels during a sequence of time periods. This latter alternative may be modified by driving a plurality of lamps, in unison, at different energy levels during the sequence of time periods.

A color wheel may be used to color the light, preferably (but not necessarily) before it impinges on the spatial light modulator. The color wheel may be rotated at a rate faster than the frame repetition rate. This can lead to several advantages. One is that some of the bit ranks for all three primary colors can be displayed during one revolution of the color wheel, and other bit ranks can be displayed during one or more subsequent revolutions. Buffer periods can be used to adjust the amount of illumination received by the spatial light modulator in accordance with the bit ranks. Another advantage is that the display of the most significant bits for a frame may be spread over two, and possibly more, revolutions of the color wheel. This means that the total amount of light of a particular color that impinges on the spatial light modulator is not limited by the product of the light intensity and the time needed for the color wheel to rotate through a single colored sector. For example, the spatial light modulator may be illuminated with red light during display of the most significant bits of the red component of an image for a period corresponding to the rotation of the color wheel through an angle of 200_, with half of this angle plus a buffer period occurring during one revolution, and the other half plus another buffer period occurring during another revolution. Illumination for the green and blue components can, of course, also be conducted in this manner. A further advantage is that buffer periods, when all of the pixels are off, may be inserted during rotation of the color wheel through one or more colored sectors or through one or more complete rotations to absorb slow or turbulent transitions from one light-intensity level to another.

According to a related aspect of the invention, a method for using a spatial light modulator can be conducted by displaying data on the spatial light modulator, shining light on the spatial light modulator, coloring the light with a color wheel (preferably before the light impinges on the spatial light modulator, but possibly after impingement of the light instead), and rotating the color wheel faster than the frame repetition rate. The method may further include integrating the light and changing at least some of the data displayed on the spatial light modulator when the integrated light reaches a predetermined value. The most significant bits for all three primary colors may be displayed during two or more revolutions of the color wheel, and different bit ranks for all three primary colors may be displayed during different revolutions. Furthermore, the intensity of the light shined on the spatial light modulator may be changed as the color wheel is rotated.

DESCRIPTION OF THE PREFERRED EMBODIMENTS

Various embodiments of a display apparatus in accordance with the present invention will now be described in detail with reference to the accompanying drawings.

The First Embodiment

Figure 1:
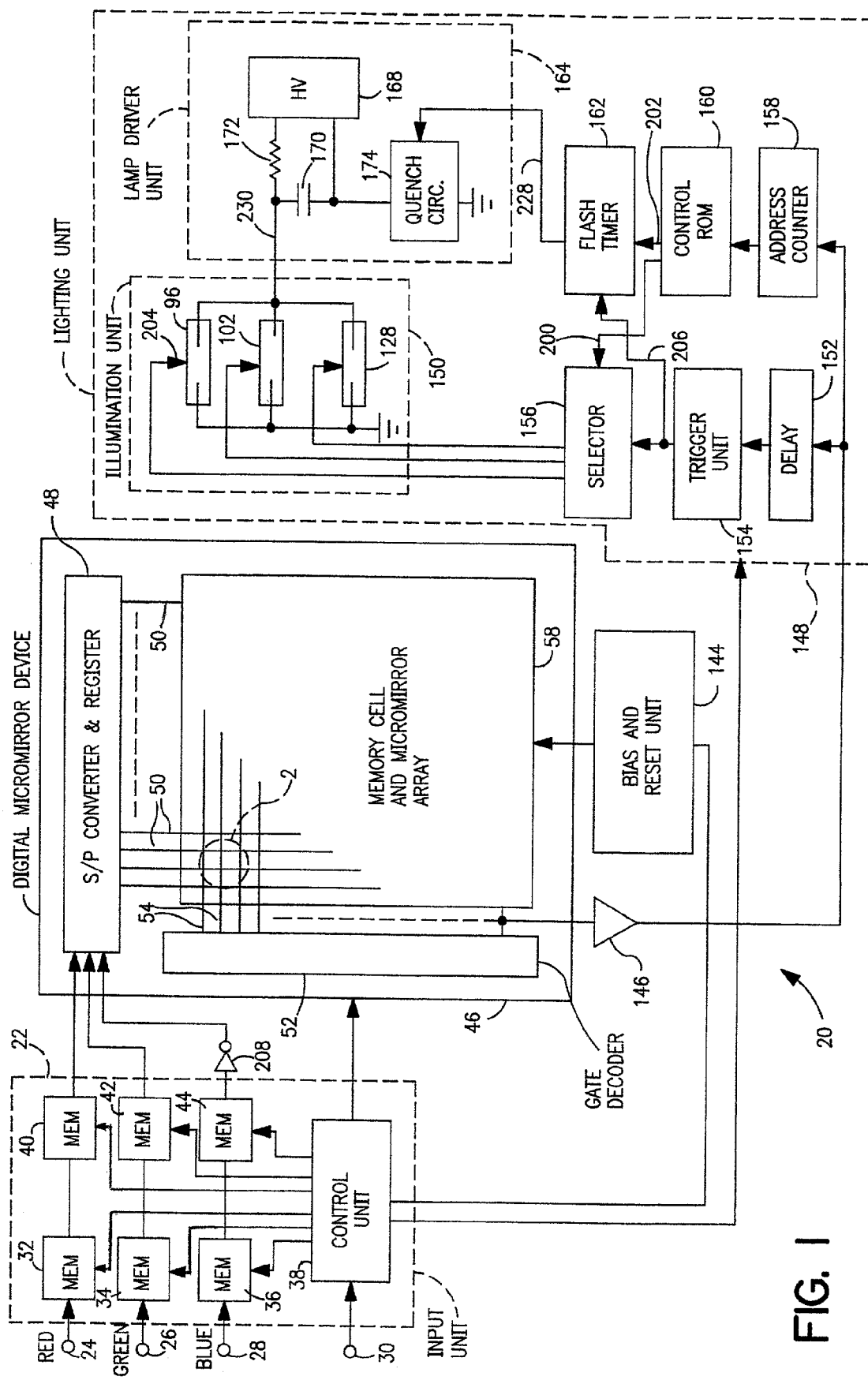
FIG. 1 is a block diagram of a display apparatus in accordance with a first embodiment of the present invention.

With initial reference to FIG. 1, a display apparatus 20 in accordance with the first embodiment includes an input unit 22 having an input terminal 24 for receiving a digitalized signal for the red component of an image, an input terminal 26 for receiving a digitalized signal for the green component, an input terminal 28 for receiving a digitalized signal for the blue component, and an input terminal 30 for receiving synchronization signals. The digitalized signals for the red, green, and blue components consist of multi-bit video data words (hereafter usually referred to as "video words"), each specifying one of a plurality of binary levels for the apparent red, green, or blue brightness of corresponding pixels that are to be displayed. The video words for the red, green, and blue components are stored in respective frame memories 32, 34, and 36 under the control of a control unit 38. When a full frame is stored, control unit 38 transfers the contents of memories 32–36 to further frame memories 40, 42, and 44 and then begins storing the next frame in memories 32–36. Control unit 38 also reads out the contents of memories 40–44 to a digital micromirror device 46 (hereafter occasionally referred to as "DMD 46").

Figure 2:
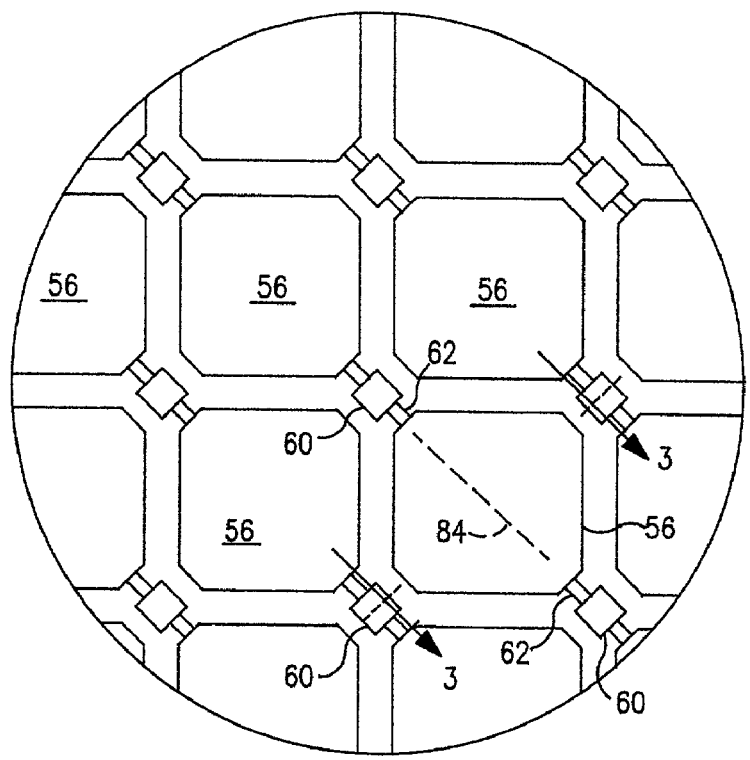
FIG. 2 is a top plane view of a detail marked 2 in FIG. 1, and shows a portion of an array of micromirrors.
Figure 3:
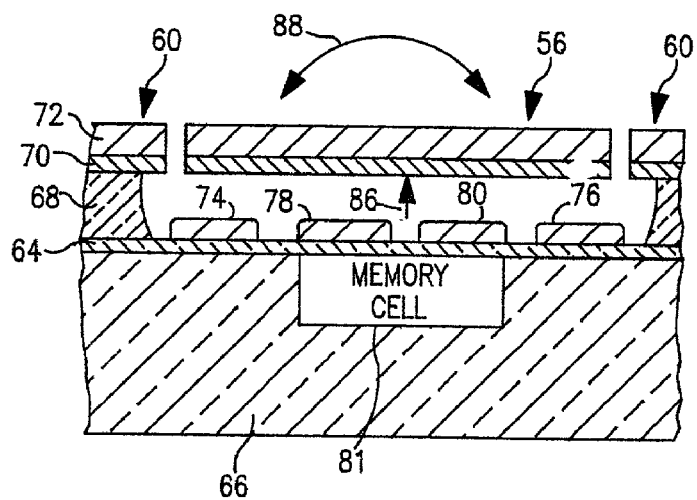
FIG. 3 is a cross-sectional view taken along line 3—3 of FIG. 2.

DMD 46 is basically an integrated circuit memory having an array of static random access memory cells, addressing means for storing data in the cells, and tiny movable mirrors or micromirrors which cooperate with the memory cells. It will be described in more detail with reference to FIGS. 1–3.

The addressing means of DMD 46 includes a serial/parallel converter and register 48 which receives a series of bits as input data and adjusts the voltages on column electrodes 50 in accordance with the input data. A gate decoder 52 strobes row electrodes 54 in sequence. Each time a row electrode is strobed the data on the column electrodes 50 is stored in a row of static memory cells corresponding to the row electrode. A micromirror 56 is disposed above each memory cell. The memory cells and micromirrors together form an array which is designated by reference number 58 in FIG. 1.

Each micromirror 56 is supported between a pair of posts 60 by torsion hinges 62. The posts 60 extend upward from a silicon dioxide layer 64 that has been deposited on a substrate 66. Each post 60 includes portions of an insulating spacer layer 68, a first metal layer 70, and a second metal layer 72. A micromirror 56 includes portions of both metal layers, while the torsion hinges 62 are fabricated from first metal layer 70 alone.

Landing electrodes 74 and 76 and actuation electrodes 78 and 80 are disposed below the micromirror 56. A negative bias voltage is selectively applied to the landing electrodes 74 and 76 and to the micromirrors 56.

The activation electrodes 78 and 80 are connected to complementary outputs of a static memory cell 82. When a value is stored in memory cell 82, one of the actuation electrodes 78 and 80 is at ground potential and the other has a positive potential. This creates a torque urging the micromirror 56 to rotate clockwise or counter-clockwise about an axis 84. Axis 84 is perpendicular to the drawing in FIG. 3 at a position marked by an arrow 86, which can be viewed as a pivot point. However the magnitude of the bias voltage applied to the micromirrors 56 and to the landing electrodes 74 and 76 is selected so that the micromirrors 56 are bistable in their operation. The bias voltage prevents the micromirrors 56 from moving in response to the torque exerted by the potentials on the actuation electrodes 78 and 80 until the bias voltage is relieved, whereupon the micromirrors 56 rotate to their new positions (if they are different from the old positions) or remain in their old positions (if they are the same as the new positions), and then the bias voltage is reapplied in order to electromechanically latch the micromirrors. This movement is indicated schematically in FIG. 3 by arrow 88. The micromirrors may occasionally stick in one position or the other, possibly due to cold welding to one of the landing electrodes 74 or 76. Stuck micromirrors 56 can be dislodged by applying resonant reset pulses to the landing electrodes and micromirrors at a frequency corresponding to the resonance frequency of the micromirrors.

Further details of the fabrication and operation of DMD 46 can be obtained 5 from U.S. Pat. Nos. 5,096,279 and 5,280,277, and from an article by Jack M. Younse entitled "Mirrors on a Chip," published at pages 27–31 of the November, 1993 issue of *IEEE Spectrum*.

Figure 4:
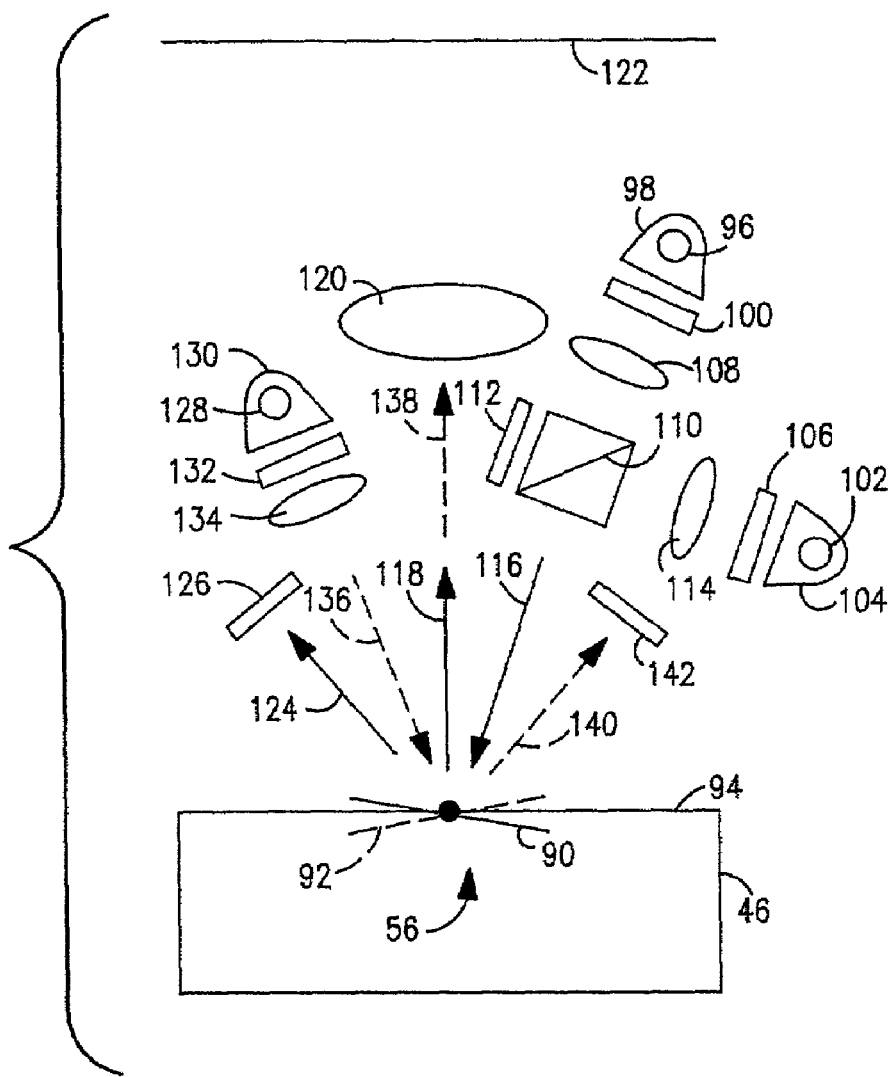
FIG. 4 schematically illustrates a lighting arrangement which is used in the first embodiment to expose the digital micromirror device to light impinging from two different directions.

In FIG. 4, a solid line 90 is used to schematically illustrate a micromirror 56 in a first position and a dotted line 92 is used to illustrate it in its second position. In its first position the micromirror 56 is rotated 10 clockwise from a horizontal plane 94 and in its second position the micromirror 56 is rotated about 10 counterclockwise. The plane 94 is parallel to the top surface of substrate 66 (see FIG. 3).

With continuing reference to FIG. 4, a lamp such as a flash tube 96 is disposed in a reflector 98 behind a red filter 100 and a lamp such as a flash tube 102 is disposed in a reflector 104 behind a green filter 106. Flash tube 96 will occasionally be referred to as the "red flash tube" hereafter, and similarly, flash tube 102 will hereafter occasionally be referred to as the "green flash tube." Light from flash tube 96 is directed through a collimating system 108 to a half-silvered mirror 110. Mirror 110 reflects half the light from flash tube 96 to an absorber 112 (black velvet, for example) and transmits the other half. A collimating system 114 is disposed between flash tube 102 and half-silvered mirror 110, which transmits half of the light from flash tube 102 to absorber 112 and reflects the other half. The transmitted light from flash tube 96 and the reflected light from flash tube 102 impinges on DMD 46 from a first direction that is indicated by arrow 116. Arrow 116 is disposed at an angle of 70 with respect to plane 94. When micromirror 56 is in its first position as indicated by solid line 90, light impinging from the first direction is reflected at an angle of 90° with respect to plane 94, as indicated by arrow 118. This light passes through a projection system 120 to a screen 122. However if light impinging from the first direction strikes a micromirror 56 which is in its second position, as indicated by dotted line 92, the impinging light is reflected in a direction marked by arrow 124 to an absorber 126. Arrow 126 is disposed at an angle of 50 with respect to plane 94.

A lamp, such as a flash tube 128, is disposed in a reflector 130 behind a blue filter 132. A collimating system 134 directs light from flash tube 128 (occasionally referred to as the "blue flash tube" hereafter) toward DMD 46, the light impinging in a second direction marked by arrow 136. Second direction 136 is disposed at an angle of 70 with respect to plane 94 and at an angle of 40 with respect to first direction 116. When micromirror 56 is in its second position, as indicated by dotted line 92, the incoming light impinging from the second direction is reflected at an angle of 90 with respect to plane 94 and thus passes through projecting system 120 to screen 122. This is indicated by an arrow 138, which is coaxial with arrow 118. However, when micromirror 56 is in its first position, indicated by line 90, light impinging from the second direction (i.e., the direction marked by arrow 136) is deflected in a direction shown by arrow 140 to an absorber 142. Absorber 142 is located at an angle of 50 with respect to plane 94.

To recapitulate, from FIG. 4 it will be apparent that red or green light impinging from a first direction marked by arrow 116 is reflected in the direction of arrow 118 when micromirror 56 is in its first position and that blue tight impinging from a second direction marked by arrow 136 is reflected in the direction of arrow 138 when micromirror is in its second position. Arrows 136 and 118 are coaxial, and both represent light which is directed toward projection system 120.

Returning to FIG. 1, display apparatus 20 also includes a bias and reset unit 144 which operates under the control of control unit 38 to supply the bias voltage and resonant reset pulses as previously discussed. A buffer 146 detects when the last row electrode 54 has been strobed and provides a signal to an exposing or lighting unit 148. The red flash tube 96, green flash tube 102, and blue flash tube 128 are part of the lighting unit 148 and serve as an illumination unit 150. Lighting unit 148 also includes a delay 152, a trigger unit 154, a selector 156, an address counter 158, a control ROM 160, a flash timer 162, and a lamp driver unit 164. Lamp driver unit 164 includes a high voltage source 168 which charges a capacitor 170 through a resistor 172 in order to supply energy to illumination unit 150 when one of the red, green, or blue flash tubes 96, 102, or 128 is fired, and a quenching circuit 174 which terminates the flash after a duration established by the flash timer 162.

Figure 5:
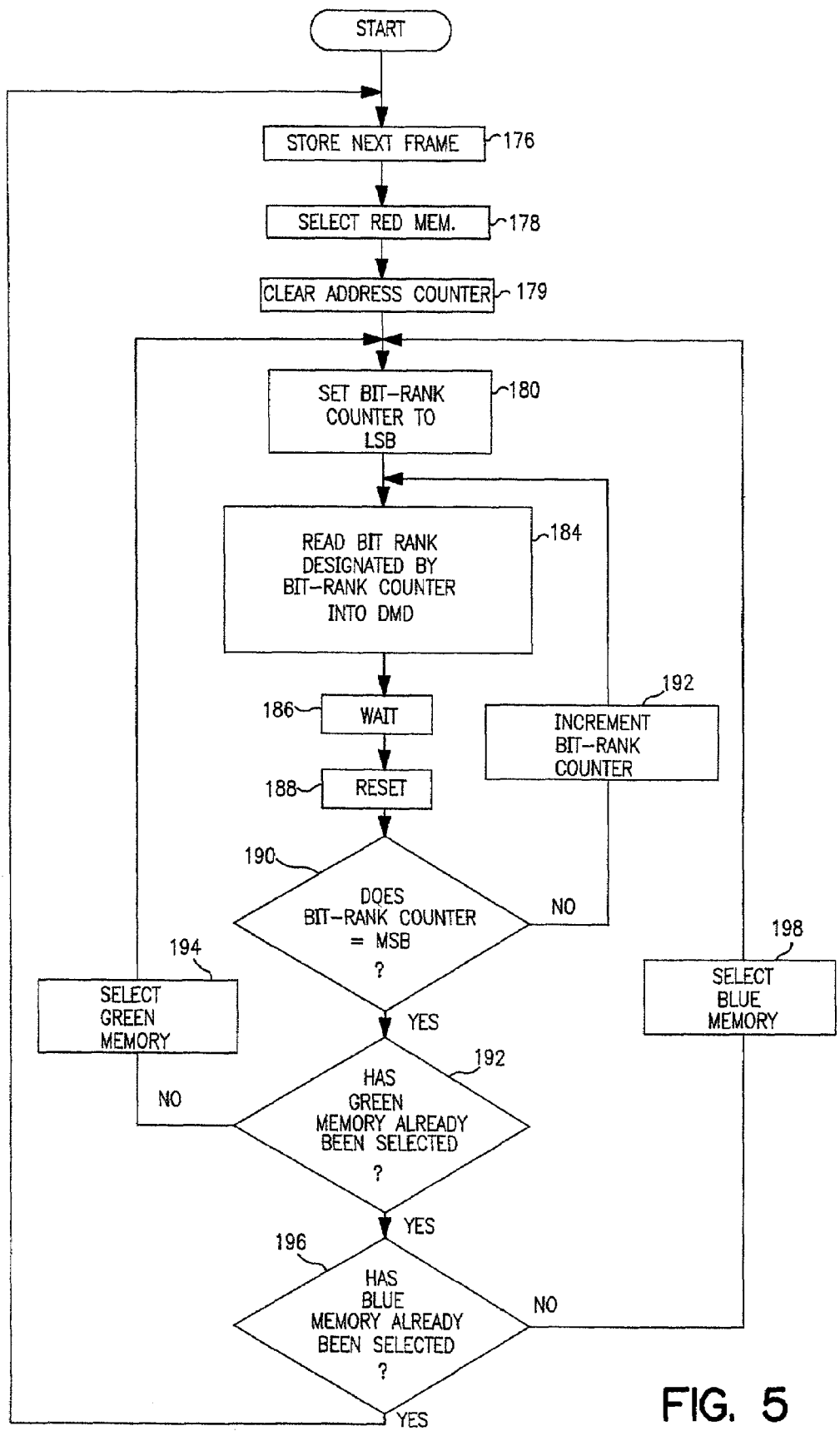
FIG. 5 is a flow chart illustrating part of the operation of the first embodiment.

The operation of display apparatus 20 is shown in the flow chart of FIG. 5. After one frame has been displayed, a new frame is stored in step 176 by transferring the red component of the new frame from memory 32 to memory 40, by transferring the green component of the new frame from memory 34 to memory 42, and by transferring the blue component of the new frame from memory 36 to memory 44. Memory 40, for example, stores video words corresponding in number and arrangement to the number and arrangement of micromirrors 56 in the DMD 46. Each of these video words has a least significant bit, a most significant bit, and at least one intermediate bit having a rank between that of the least significant bit and the most significant bit. Memories 42 and 44 are similar, except that they store video words for the green and blue components of the image.

Memory 40 is selected in step 178, and address counter 158 is cleared to 0 in step 179. A bit-rank counter in control unit 38 is set to 1, indicating the least significant bit, in step 180. Address counter 158 is cleared to 0 in step 182.

The bit rank designated by the bit rank counter is read into DMD 46 during 5 step 184. When the bit rank counter is set to the least significant bit, this means that the least significant bit for all the video words which are stored in memory 40 (and which correspond to respective micromirrors 56) are transferred to memory cell and micromirror array 58. This is accomplished by transferring the least significant bits for a first raster line to serial/parallel converter and register 48 and strobing a first row electrode 54, transferring the least significant bits for a second raster line to converter and register 48 and strobing a second row electrode 54, and so forth until the least significant bits for the last raster line for the red component are transferred to converter and register 48 and the last row electrode 54 is strobed. Thereafter the program waits at step 186 for a period which permits lighting unit 148 to fire red flash tube 96 at a low level. This will be discussed in more detail later. Resonant reset pulses are supplied from unit 144 during step 188 in order to dislodge any micromirrors 56 that may have become stuck. Then a check is made at step 190 to determine whether the content of the bit rank counter in control unit 38 is equal to the most significant bit. If not, the bit rank counter is incremented at step 192 and the program returns to step 184. In the second repetition, the bits of the red component having a rank just above the least significant bits are transferred to array 58 in step 184, and the program waits at step 186 while lighting unit 148 administers a red flash having twice the light that was emitted during the flash for the least significant bits. Steps 184–190 are performed until the most significant bits of the red component have been displayed on array 58 and exposed to a red flash at a level commensurate with the most significant bit.

After the most significant bits of the red component have been displayed ("YES" at step 190), a check is made at step 192 to determine if memory 42, which stores the green component, has already been selected. If not, it is selected at step 194 and the program returns to step 180. The bits of the green component are displayed rank-by-rank, from the least significant bit to the most significant bit, while DMD 46 receives flashes of green light of increasing binary levels from lighting unit 148. If memory 42 has already been selected ("YES" at step 192), a check is made at step 196 to see whether memory 44 has been selected. If not, memory 44 is selected at step 198 and the blue component of the frame is displayed on DMD 46 rank-by-rank white lighting unit 148 supplies flashes of blue light at levels commensurate with the bit ranks which are being displayed. After the blue component has been displayed ("YES" at step 196), the program returns to step 176 and the red, green, and blue components of the next frame are displayed in the same way.

What happens during the wait at step 186 will now be described in more detail.

When the last row electrode 54 is strobed during storage of the least significant bits of the last raster line of the red component, buffer 146 supplies a pulse to lighting unit 148. This pulse is counted by address counter 158, which was cleared at step 179 in FIG. 5 and thus provides an output of 00 . . . 1 as an address signal to control ROM 160. ROM 160 stores lighting control words which determine which of the red, green, and blue flash tubes is selected and the level at which the selected flash tube is flashed. Each lighting control word includes a 3-bit color selection portion which is supplied via a bus 200 to selector 156 and a multi-bit light level portion which is supplied via a bus 202 to flash timer 162. The light level portion determines how long a flash is to last. The flash from a least significant bit is brief. For the next-least significant bit, the duration established by the light level portion provides a flash with twice the total amount of light that was emitted during the flash for the least significant bit. For the next least significant bit, the duration provides a flash with four times the total amount of light as the flash for the least significant bit. The durations of the flashes for higher-order bits are set in a similar way, with the amount of tight liberated during a flash being commensurate with the rank of a bit. The color selection portion of the lighting control word is 001 if red flash tube 96 is to be selected, 010 if green flash tube 102 is to be selected, and 100 if blue flash tube 128 is to be selected.

The pulse from buffer 146 is delayed by the delay in unit 152 and then supplied to trigger unit 154, which generates a trigger pulse that is delivered to selector 156. Since the color selection portion of the lighting control word stored at location 00 . . . 1 in ROM 160 is 001, selector 156 forwards the trigger pulse to the trigger terminal 204 of red flash tube 96. This initiates a flash, using the energy stored on capacitor 170. The trigger pulse is also supplied via line 206 to flash timer 162, which begins timing the flash. Although not shown, flash timer 162 may include an oscillator, a counter which begins counting pulses from the oscillator when it receives the trigger signal on line 206, a register which holds the light level portion of the lighting control word received from ROM 160, and a comparator which signals quenching circuit 174 when the content of the counter reaches the value stored in the register.

After the flash for the least significant bit of the red component, further flashes for the red component are orchestrated under the control of subsequent lighting control words read out of ROM 160. The color selection portion of the lighting control words for all of the red flashes is 001 but the light level portions command different amounts of light that increase in a binary manner as indicated above. After the flashes of the red component, the flashes for the green and blue components are generated in a similar manner.

With reference next to FIGS. 1 and 4, it will be recalled that the red and green flashes impinge on DMD 46 from a first direction 116. When a particular bit of the red or green component is logical 1, the micromirror 56 which is influenced by that bit is moved to the position shown by line 90 and reflects the impinging light in the direction of arrow 118 to projecting system 120. However the blue flashes impinge on DMD 46 from a second direction marked by arrow 136, and when the micromirror 56 is in the position marked by solid line 90 these flashes are diverted to absorber 142. This is the reason why an inverter 208 is shown in FIG. 1 to invert the blue component stored in memory 44 before the blue component is transferred to converter and register 48. When a particular bit of the actual blue component is logical 1, meaning that a spot of blue light should be displayed on screen 122, inverter 208 inverts the bit to logical 0 in order for the corresponding flash of blue light to be reflected in the proper direction for display. That is, the position of a micromirror 56 indicated by solid line 90 is a display position for red and green dots but not for blue dots, and the position shown by dotted line 92 is a display position for blue dots but not for red or green dots.

It will be apparent to those skilled in the art that some of the functions performed by lighting unit 148 can be transferred to control unit 38. For example, lighting control words can be dealt out by a microprocessor in control unit 38, making counter 158 and ROM 160 unnecessary. It will also be apparent that unit 144 may apply and relieve the bias voltage in a manner which electromechanically latches the micromirrors 56 until they can all be updated at once at the conclusion of step 184. However, simultaneous updating of the micromirrors 56 is not necessary since it is only their positions at the time of a flash that counts. That is, it is sufficient if all of the micromirrors are in their updated positions at the end of step 184.

The Second Embodiment

Figure 6:
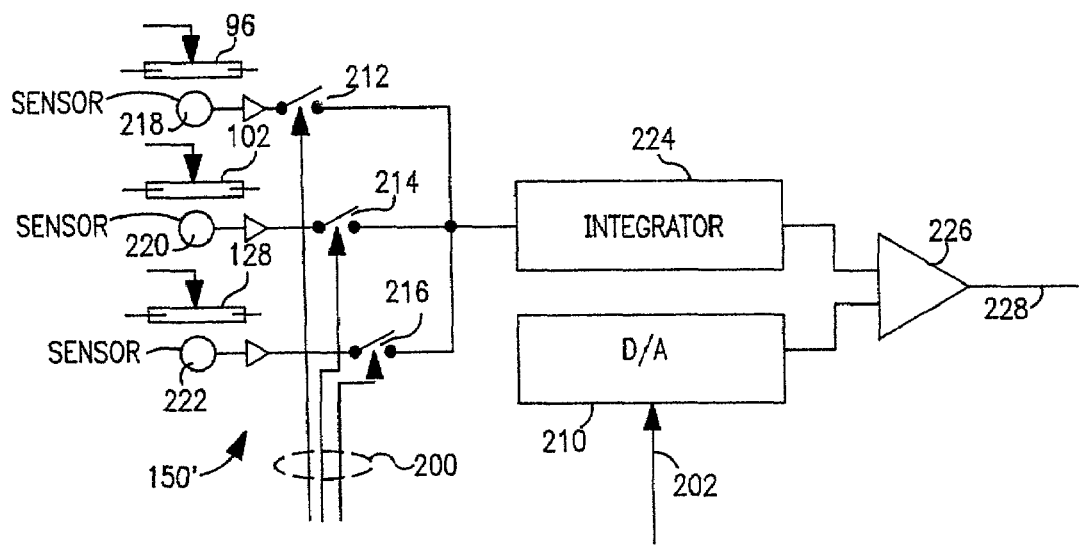
FIG. 6 is a block diagram illustrating an illumination unit in a second embodiment of the invention.

FIG. 6 illustrates a portion of the lighting unit in accordance with a second embodiment of the display apparatus of the present invention. This embodiment has a modified illumination unit 150' and not does require flash timer 162. Instead, the light level portions of the lighting control words are supplied from ROM 160 (see FIG. 1) to a D/A converter 210.

Illumination unit 150' includes lamps such as a red flash tube 96, a green flash tube 102, and a blue flash tube 128 which receive trigger signals from selector 156 (see FIG. 1). The color selection portions of the lighting control words are supplied to selector 156 as in the first embodiment, and are also supplied via a bus 200 to switches 212, 214, and 216. A light sensor 218 and an amplifier (not numbered) are connected to the input side of switch 212; a light sensor 220 and an amplifier (not numbered) are connected to the input side of switch 214; and a light sensor 222 and an amplifier (not numbered) are connected to the input side of switch 216. The color selection portion of the lighting control word causes one of the switches 212, 214, and 216 to close before the corresponding flash tube is flashed, thereby selecting which sensor signals are supplied to an integrator 224 during a flash. A comparator 226 emits a signal on line 228 to quench circuit 174 (see FIG. 1) when the total amount of light sensed during a flash is equal to that designated by the light level portion of the lighting control word.

In the first embodiment, the flash duration was controlled in order to set the total amount of light emitted during each flash. However, in the first embodiment the relation between flash duration and the total amount of light must be determined experimentally for a flash tube of a particular type before appropriate light level portions can be stored in ROM 160. The illumination unit 150' of the present embodiment alleviates this problem by measuring the flashes as they occur and comparing the integrated flashes with the desired light level.

The Third Embodiment

Figure 7:
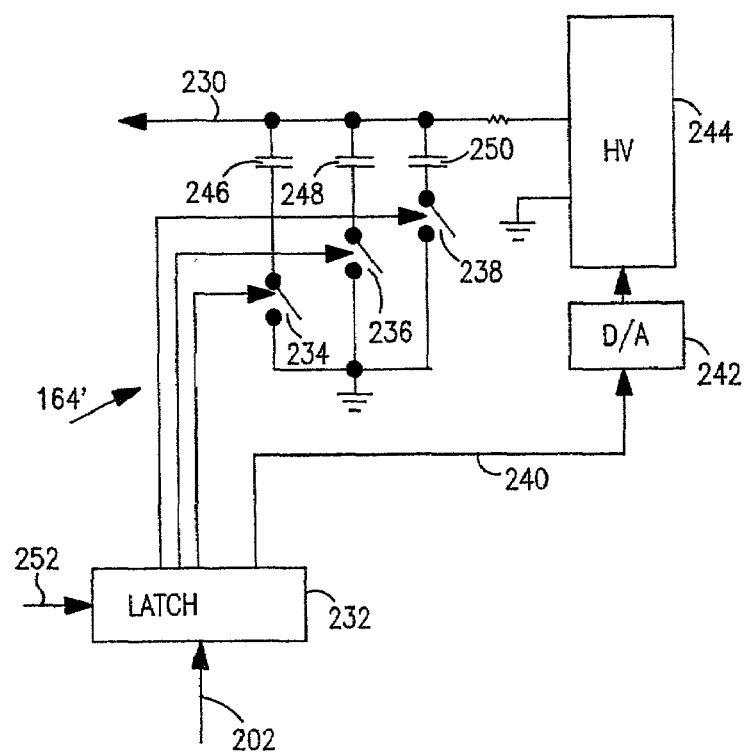
FIG. 7 is a block diagram illustrating a lamp driver unit in a third embodiment.
Figure 8:
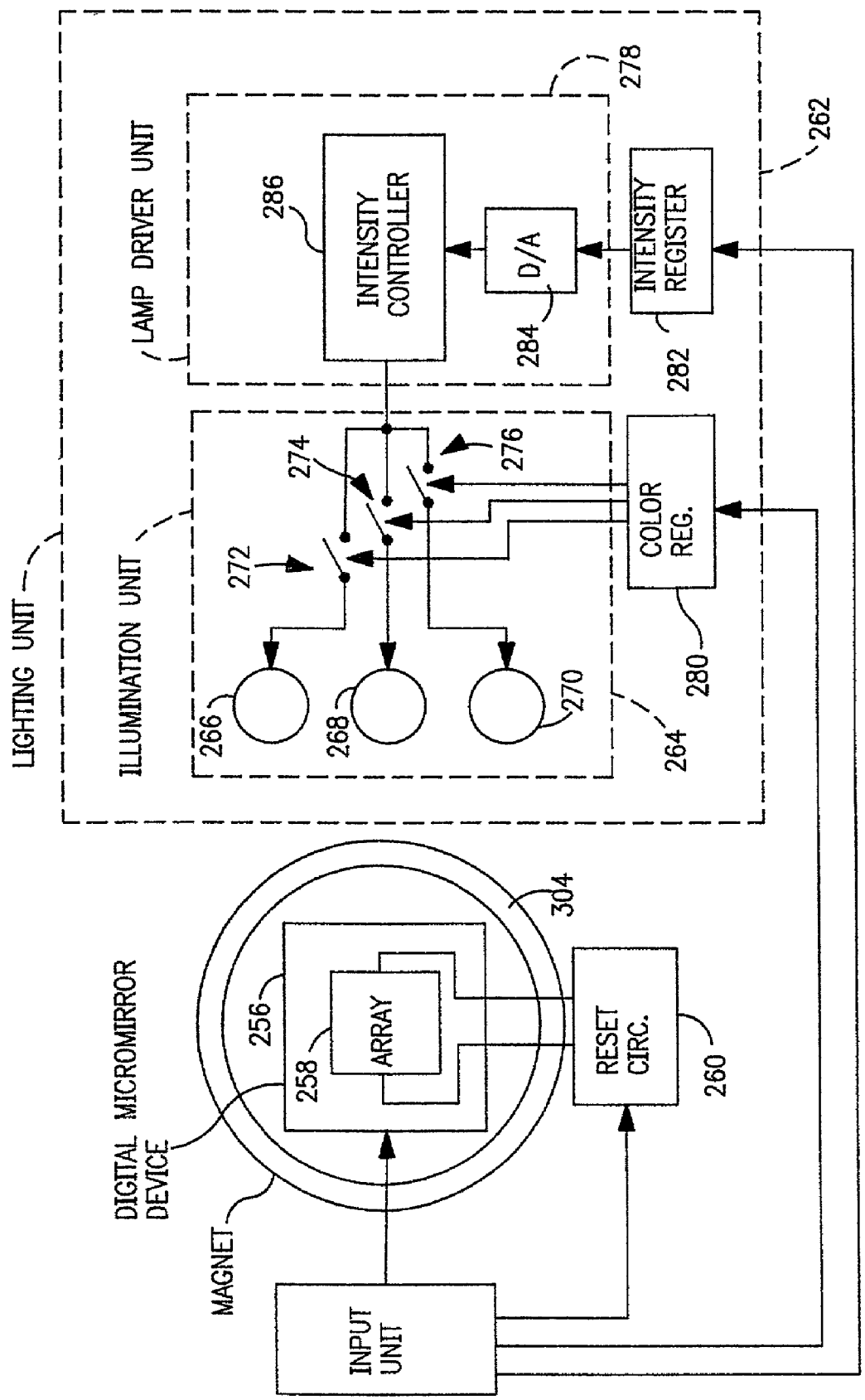
FIG. 8 is a block diagram of a display apparatus in accordance with a fourth embodiment of the present invention.

FIG. 7 illustrates a portion of an exposing or lighting unit in accordance with a third embodiment of the present invention. This lighting unit includes a modified lamp driver unit 164' which supplies power to the illumination unit 150 (see FIG. 1) via a line 230. Flash timer 162 is unnecessary in this embodiment. Lamp driver unit 164' includes a latch 232 which receives the light level portion of the lighting control words from ROM 160 (see FIG. 1) via bus 202. The light level portion itself in this embodiment has a three-bit capacitance-selection portion which determines which of switches 234, 236, and 238 will be closed and a multi-bit charging-voltage portion which is supplied via a bus 240 to a D/A converter 242. D/A converter 242 supplies an analog signal to a control input port of a high voltage source 244, which charges capacitors 246, 248, and/or 250, depending upon which of switches 234–238 is closed, to the voltage set by the charging-voltage portion of the lighting control word.

Suppose that the capacitance of capacitor 250 is C units, that the capacitance of capacitor 248 is also C units, and that the capacitance of capacitor 246 is 2C units. This means that the total capacitance is C when switch 238 is closed, 2C when both the switches 236 and 238 are closed, and 4C when all three switches are closed.

The energy E stored on a capacitor having capacitance C is given by the following equation:

$$E = \tfrac{1}{2} C V^2$$

Accordingly, for a given charging voltage V, one unit of energy can be stored by closing switch 238, two units of energy can be stored by also closing switch 236, and four units of energy can be stored by also closing switch 234. To store eight units of energy, only capacitor 250 would be charged, but it would be charged to a voltage that is larger than the original voltage V by a factor of $2\sqrt{2}$. Sixteen units of energy can be stored by charging both capacitors 248 and 250 to the higher voltage, $2\sqrt{2}V$. Thirty-two units of energy can be stored by charging all three capacitors to the higher voltage. This is summarized in the following Table:

TABLE

| Energy | Capacitance | Voltage |
|---|---|---|
| 1 | C | V |
| 2 | 2C | V |
| 4 | 4C | V |
| 8 | C | 2Vsqrt2 |
| 16 | 2C | 2Vsqrt2 |
| 32 | 4C | 2Vsqrt2 |

It will be apparent from the foregoing that the energy emitted during a flash 20 can be controlled by designating the total capacitance using the capacitance selection portion of the lighting control word and the voltage using the charging voltage portion of the lighting control word. Even the simple example illustrated in the Table above shows that six binary levels are readily available, and more can easily be added by increasing the number of capacitors or the number of voltage levels to which they are charged.

From the discussion of the first embodiment it will be recalled that address counter 158 (see FIG. 1) supplies a new address to control ROM 160 each time the last row electrode 54 is strobed. In the third embodiment, however, it is desirable to let the selected capacitor or capacitors charge while new values are being read into array 58, and not to change the selection of capacitors or the charging voltage until after the flash has been delivered. For this reason, in the third embodiment control unit 38 emits a latch signal on line 252 when it begins reading a new bit rank into DMD 46 (step 184 in FIG. 5), at which point the lighting control word supplied by ROM 160 is latched. A new lighting control word is read out of ROM 160 when the last row electrode 54 is strobed, and the color selection portion of this new lighting control word determines which of the flash tubes 96, 102, and 128 is flashed, but the light level portion designated by the old lighting control word remains effective until after the flash is generated.

The Fourth Embodiment

A fourth embodiment of the display apparatus in accordance with the present invention will now be described with reference to FIGS. 8, 9, and 10A–10C. In this embodiment, an input unit 254 supplies digitalized red, green, and blue video words to a digital micromirror device or DMD 256. DMD 256 includes a memory cell and micromirror array 258. The display apparatus of this embodiment also includes a reset circuit 260 and an exposing or lighting unit 262.

The lighting unit 262 includes an illumination unit 264 having a red fluorescent lamp 266, a green fluorescent lamp 268, and a blue fluorescent lamp 270. Switches 272, 274, and 276 in illumination unit 264 selectively connect the lamps to a lamp driver unit 278. A color register 280 receives a three-bit color selection signal from input unit 254 to control which of the switches is closed. Switch 272 is closed to connect red lamp 266 to lamp driver unit 278 when the color selection signal is 100; switch 274 is closed to connect green lamp 268 to lamp driver unit 278 when the color selection signal is 010; and switch 276 is closed to connect blue fluorescent lamp 270 to lamp driver unit 278 when the color selection signal received from input unit 254 is 001.

Lighting unit 262 also includes an intensity register 282, which receives a multi-bit light intensity signal from input unit 254. The light intensity signal signifies how intensely the selected lamp is to be driven. The light intensity signal stored in register 282 is converted to analog by a D/A converter 284 and then supplied to a control input port of an intensity controller 286. Controller 286 steadily drives the selected lamp at the desired intensity by varying its duty cycle. In this application, "steady" emission of light by a selected lamp during an interval means light that is emitted throughout the interval, even if the light may be periodically interrupted during the interval due to duty cycle control of the intensity of the illumination.

In the embodiments previously described, a negative bias voltage was supplied to the landing electrodes and the micromirrors to electromechanically latch the micromirrors into place while the memory cells were being updated, the bias voltage being briefly released thereafter to permit the micromirrors to move to their new states simultaneously. In contrast, in the present embodiment, the landing electrodes and the micromirrors are kept at ground potential (or at a negative potential whose absolute value is insufficient to cause electromechanical latching). Each row of micromirrors is therefore free to respond while the memory cells beneath them are updated. If light is shining on the micromirrors at a time when all of them are positioned to be OFF and if the micromirrors are then moved to their ON positions on a row-by-row basis from the first row to the last row, it is apparent that the first row of micromirrors receives more light than the last row. But if the micromirrors are then turned OFF from the first row to the last row, at the same rate they were previously turned ON, they will remain in the ON state for the same amount of time and consequently receive the same amount of light if they are steadily illuminated. When the turn-on and turn-off periods are considered together, each row receives half of the total amount of light emitted during the two periods.

The operation of this embodiment will now be described. It will be assumed that the red, green, and blue video words which DMD 256 receives from input unit 254 each have six bits. The discussion will start with the display of the least significant bit of the red component of the frame.

Figure 10:
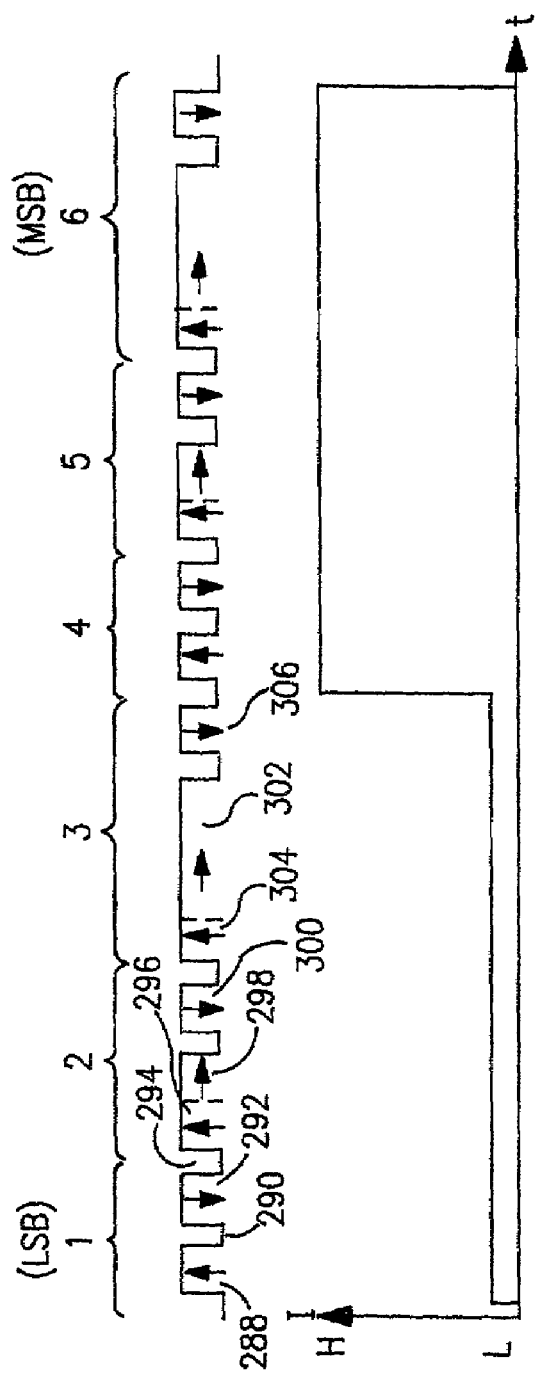
FIGS. 10A, 10B, and 10C pertain to the fourth embodiment and respectively illustrate the rank of bits that are displayed, how the writing, erasing, and maintaining of information displayed on the digital micromirror device depends upon the bit rank, and how the intensity of the lighting depends upon the bit rank.

Input 254 supplies color register 280 with a color control signal having a value of 100, thus causing switch 272 to close and connecting red lamp 266 to lamp driver unit 278. Input unit 254 also supplies register 282 with a light intensity signal which causes controller 286 to vary the duty cycle of lamp 266 so as to drive it at a low level L (see FIG. 10C). Then input unit 254 supplies the least significant bits of the red component row-by-row to DMD 256 during a turn-on period marked by reference 288 number in FIG. 10B. Turn-on periods in FIG. 10B, it is noted, are designated by upward arrows. Thereafter there is a brief resetting period 290 (the duration of which is much exaggerated in FIG. 10B) followed by a turn-off period 292 during which the micromirrors are turned off row-by-row at the same rate they were turned on previously (turn-off periods are identified by downward pointing arrows in FIG. 10B, and have the same duration as the turn-on periods). This completes the display of the least significant bit, as indicated in FIG. 10A. There follows a resetting period 294. As is the case with the other resetting periods shown in FIG. 10B, the duration of period 294 is exaggerated considerably in the drawing.

The display of the second bit begins with a turn-on period 296 followed by a maintain period 298 of the same duration. It is noted that maintain periods are designated in FIG. 10B by horizontal arrows. After a resetting period (not numbered), the display of the second bit is concluded by a turn-off period 300. Each row of micromirrors receives the same amount of light during the maintain period 298 as it does during the turn-on and turn-off periods 296 and 300 together. Thus, the total amount of light received during display of the second bit by each row of micromirrors is twice that received during display of the least significant bit. This can be designated as 2L, in contrast to an amount 1L of light received during display of the least significant bit.

The maintain period 302 during display of the third bit is three times as long as the turn-on period 304 or the turn-off period 306. Consequently, the amount of light received by each row of micromirrors during display of the third bit is 4L.

At this point, input unit 254 supplies register 282 with an intensity signal which causes the intensity of the red light to increase eight-fold, to a new level H. The display of the fourth bit is accomplished with a turn-on period and a turn-off period but no maintain period. In this respect, the display of the fourth bit is the same as the display of the least significant bit, except the illumination is now at a high level H=8L. Thus, twice as much light is received by each row of micromirrors during display of the fourth bit as was received during display of the third bit.

Display of the fifth bit and the sixth or most significant bit is the same as the display of the second and third bits, except at the higher intensity level H. After the most significant bit of the red component has been displayed, the green and blue components are displayed in a similar manner.

Although a biasing potential is not used to latch the micromirrors in this embodiment, it is still necessary to be concerned about sticking of the micromirrors due, perhaps, to cold welding. A torroidal magnet 304 is disposed around DMD 256 to create a magnetic field in the region of the micromirrors. This field has a vertical component (with respect to FIG. 8) which passes through array 258. As is shown schematically in FIG. 9, each row of micromirrors is connected to the reset circuit 260. Input unit 254 supplies a signal to reset circuit 260 during the resetting periods (e.g., 290, 294, and so forth), whereupon reset circuit 260 emits a pulse of electrical current which flows through each row of micromirrors. The interaction of the current and the magnetic field established by magnet 304 generates a Lorentz force which jostles each micromirror and thereby dislodges any that have become stuck. If desired, a series of current pulses can be generated by reset circuit 260 during each reset period, the series of pulses having a frequency matching the resonance frequency of the micromirrors.

Figure 9:
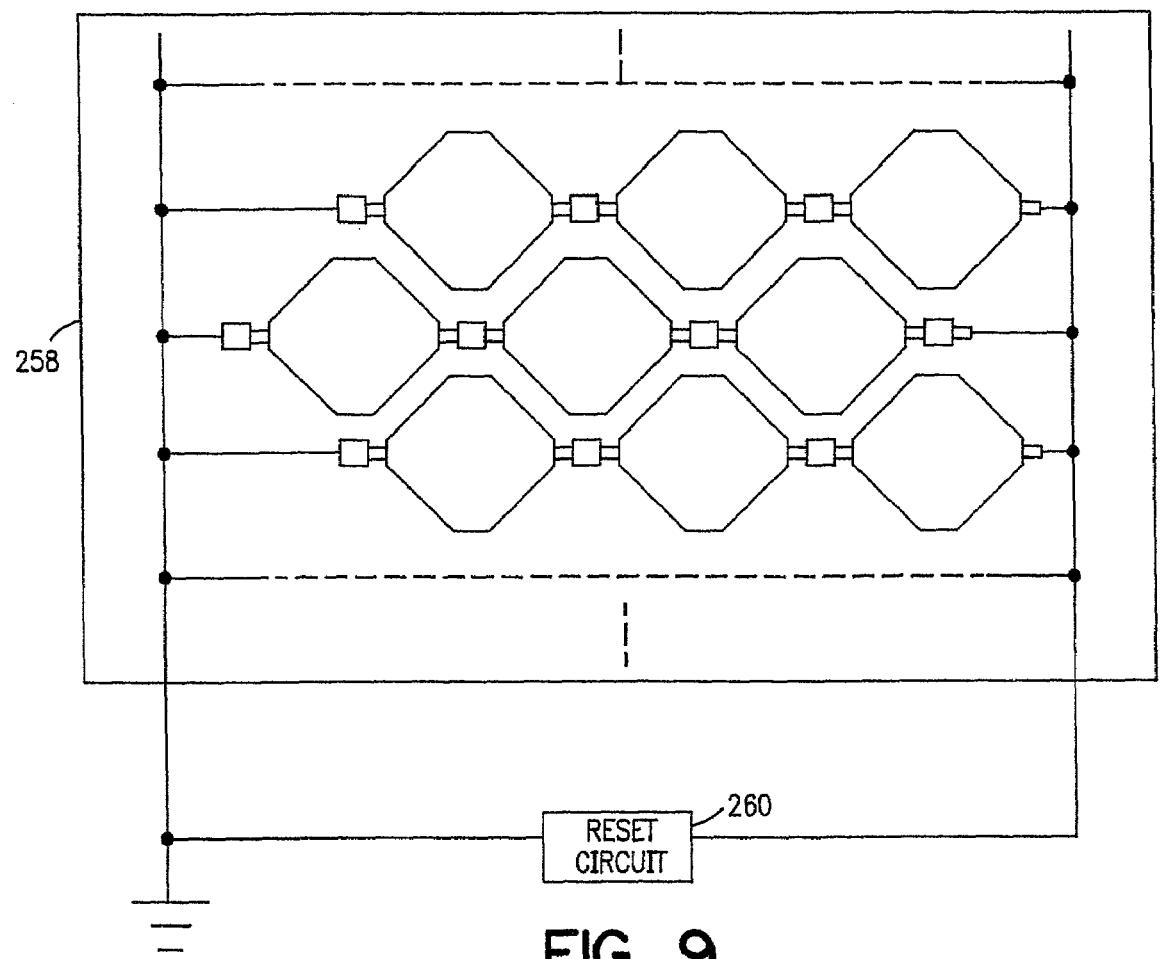
FIG. 9 is a top plan view schematically illustrating some of the micromirrors in the array shown in FIG. 8 and a reset circuit that emits pulses of current which interact with a magnetic field in order to dislodge any micromirrors that become stuck.

As will be noted from FIG. 9, in this embodiment the micromirrors of alternate rows are offset with respect to the column direction. To compensate for this, it is desirable for the color signals for alternate raster lines to be shifted in phase by half of the pitch of the micromirrors before they are supplied to input unit 254. However if all of the input signals have the same phase, the values for adjacent pixels of alternate raster lines can be averaged in unit 254 before being supplied to DMD 256.

The Fifth Embodiment

The fifth embodiment employs a lighting unit 262 (see FIG. 8), as in the fourth embodiment. Unlike the fourth embodiment, though, the fifth embodiment dispenses with the reset circuit 260 and torroidal magnet 304 that were employed in the fourth embodiment. Instead, the fifth embodiment uses conventional means (such as resonant repulses) to dislodge any micromirrors that have become stuck, and conventional biasing to electromechanically latch the micromirrors as the memory cells beneath them are being updated, as in the first embodiment (e.g., bias and reset unit 144 in FIG. 1).

Since electromechanical latching of the micromirrors is employed in the fifth embodiment, all of the micromirrors are updated simultaneously when a new bit rank of the video words is displayed. This, of course, makes it unnecessary to turn the micromirrors off, as in the fourth embodiment, before proceeding to a new bit rank. The turn-off periods shown in FIG. 10B (marked by downward arrows) can therefore be omitted. The result is that the least significant bits are displayed as the DMD is illuminated at the low level L for a predetermined period of time. The micromirrors are updated in accordance with the second least significant bits, and the DMD is illuminated at the level L for twice the predetermined period. The micromirrors are updated in accordance with the third least significant bits, and the DMD is illuminated at the level L for four times the predetermined period. The micromirrors are updated in accordance with the fourth least significant bits, and the DMD is illuminated at the high level H for the predetermined period of time. The micromirrors are updated in accordance with the fifth least significant bits, and the DMD is illuminated at the H level for twice the predetermined period. The micromirrors are updated in accordance with the most significant bits, and the DMD is illuminated at the H level for four times the predetermined period. That is, FIGS. 10A and 10C remain unchanged in the fifth embodiment.

The Sixth Embodiment

Figure 11:
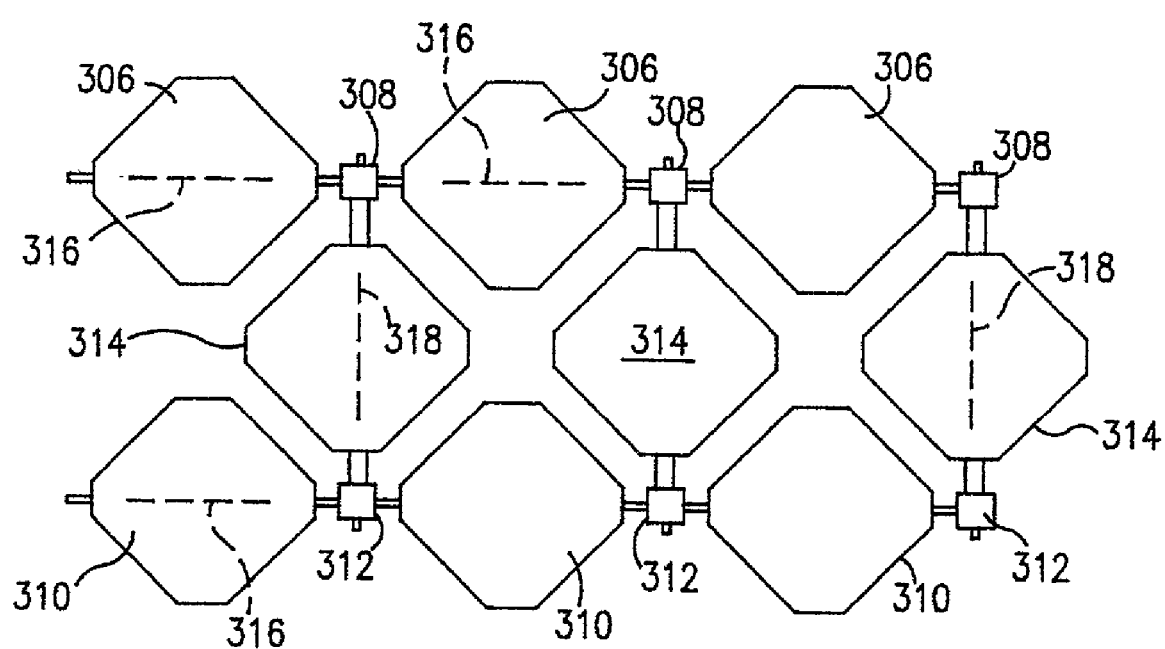
FIG. 11 illustrates a portion of the micromirror array in a sixth embodiment, which employs light impinging from three different directions.

In an embodiment shown in FIG. 11, micromirrors 306 in a first row are supported by posts 308 in the first row and micromirrors 310 in a second row are supported by posts 312 in the second row. However micromirrors 314 in an intermediate row do not have their own posts, but are instead supported by the posts 308 and 312 of the first and second rows. As a result of this arrangement, the micromirrors 306 and 310 pivot about axes 316 while the micromirrors 314 of the intermediate row pivot about orthogonal axes 318.

Fluorescent lamps are used in this embodiment and they steadily emit light when selected, as in the fourth embodiment. Their geometry is different from that shown in FIG. 4 in the following respects: The red and blue fluorescent lamps 266 and 270 are oriented the same way as the corresponding red and blue lamps 96 and 128 in FIG. 4. Red light therefore impinges on the DMD from a first direction 116 and blue light impinges on it from a second direction 136 (the video words for the blue component of the image are inverted, of course, as in the first embodiment). The first and second directions 116 and 136 lie in a common plane which is perpendicular to the pivot axes 318 shown in FIG. 11. Thus, when the micromirrors 314 are pivoted to the right (with respect to FIG. 11) they can display red dots on screen 122, and when they are pivoted to the left they can display blue dots.

The green fluorescent lamp is located in a plane which is perpendicular to the pivot axes 316 and thus to the common plane of the first and second directions 116 and 136. That is, the position of green lamp 102 in this embodiment would not be the same as shown in FIG. 4, and half mirror 110 would be unnecessary. When micromirrors 306 and 310 are pivoted upward (with respect to FIG. 11) they display green dots and when they are pivoted downward they are OFF.

From this arrangement, every other row of micromirrors provides a raster line which displays both the red and blue components of the image and the remaining micromirrors provide raster lines which display the green component. Consequently two rows of micromirrors are needed to display all three color components, and thus the resolution attainable by this embodiment is not as large as that afforded by previous embodiments. However, this embodiment has two significant advantages. One is that the light loss associated with half mirror 110 in FIG. 4 is avoided. The other is that the green component can be displayed by the micromirrors 314 while either the red or the blue component is displayed by the micromirrors 306 and 310. Because of this, the lamps for the red and blue components can be active for approximately half of the frame period rather than a third, and the lamp for the green component can be active for approximately the entire frame period. Consequently the power of the lamps can be reduced.

A modification of the resetting arrangement employed in the fourth embodiment can also be used with this embodiment. A magnet 304 would be used, as would a reset circuit which emits current pulses to generate a Lorentz force. The current pulses would be applied horizontally through rows which include micromirrors 306 and 310 and then vertically through columns which include micromirrors 314.

The two-axis arrangement shown in FIG. 11 can also be used for optical switching of two optical signals that can be distinguished from one another, as by using orthogonal polarizations. For example, the micromirrors 306 and 310 could be used to switch light having a first polarization up or down, and the micromirrors 314 could be used to switch light having a second polarization left or right. A single DMD could be divided into clusters of micromirrors, with light that has been switched by one cluster being input to another cluster for the purpose of further switching.

The Seventh Embodiment

Figure 12:
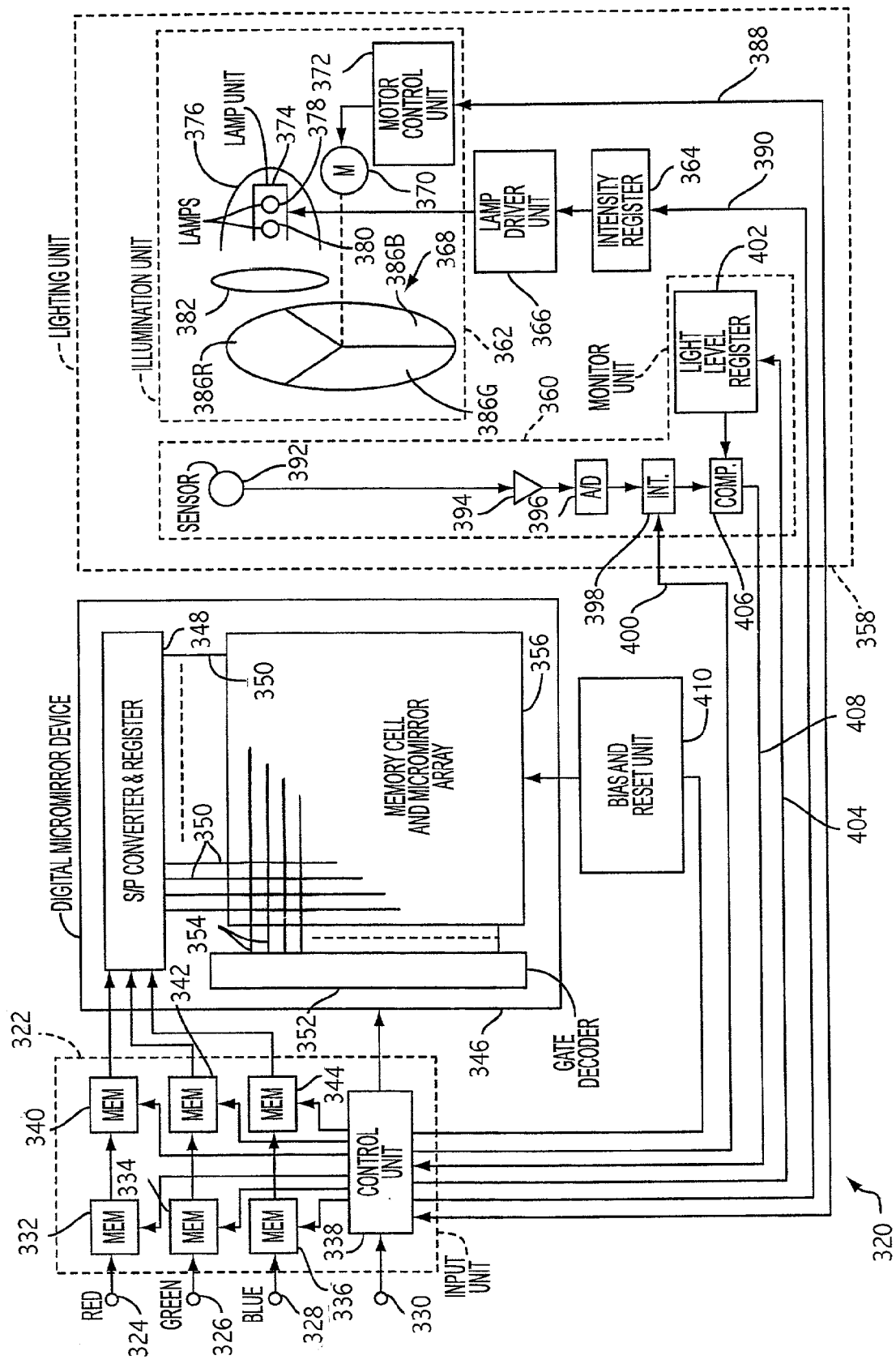
FIG. 12 is a block diagram illustrating the construction of a display apparatus that can be used to carry out a first embodiment of the method of the present invention.

A display apparatus 320 in accordance with the seventh embodiment is shown in FIG. 12, and includes an input unit 322 having an input terminal 324 for receiving video words for the red component of an image, an input terminal 326 for receiving video words for the green component, an input terminal 328 for receiving a video words for the blue component, and an input terminal 330 for receiving synchronization signals. Each video word specifies one of a plurality of binary levels for the red, green, or blue intensity of a corresponding pixel that is to be displayed. The video words for the red, green, and blue components are stored in respective frame memories 332, 334, and 336 under the control of a control unit 338, which includes a microprocessor. When a full frame is stored, control unit 338 transfers the contents of memories 332–336 to further frame memories 340, 342, and 344, and then begins storing the next frame in memories 332–336. Control unit 338 also reads out the contents of memories 340–344 to a display unit having an addressable spatial light modulator with an array of bi-stable (that is, either on or off) pixels. In this embodiment, the display unit is a digital micromirror device (DMD) 346.

The addressing means for DMD 346 includes a serial/parallel converter and register 348 which receives a series of bits as input data and adjusts the voltages on column conductors 350 in accordance with the input data. The addressing means also includes a gate decoder 352 which strobes row electrodes 354 in sequence. Each time a row electrode is strobed, the data on the column electrodes 350 are stored in a row of static memory cells corresponding to the row electrode. A micromirror is disposed above each memory cell and serves as a pixel that is controlled by the memory cell. The memory cells and micromirrors together form an array which is designated by reference number 356 in FIG. 12.

A lighting unit 358 exposes the micromirrors to red, green, and blue light having different intensity levels as the micromirrors are turned on and off to build up a frame image. A "frame image" is intended to refer to what is to be displayed by the pixels of all of the rows of micromirrors that are to participate in forming an image during any one scanning cycle of array (that is, a frame image consists of the pixels of all of the rows in array 356 if progressive scanning is used, and alternating rows if interlaced scanning is used). In what follows, it will be assumed that progressive scanning is employed, so that a frame image represents a complete snapshot of what is being displayed. The lighting unit 358 includes a monitor unit 360, an illumination unit 362, an intensity register 364, and a lamp driver unit 366.

The illumination unit 362 includes a color wheel 368, which is rotated by a motor 370 that is controlled by a motor control unit 372. A lamp unit 374 is disposed in a housing 376. The lamp unit 374 has a low-intensity lamp 378 and a high-intensity lamp 380. The intensity of lamp 380 is seven times greater than that of lamp 378. That is, if lamp 378 has an intensity of one in arbitrary units, lamp 380 has an intensity of seven, and both lamps together have an intensity of eight. An optical system 382, which is illustrated only schematically, collimates light from the lamp unit 374.

Figure 13:
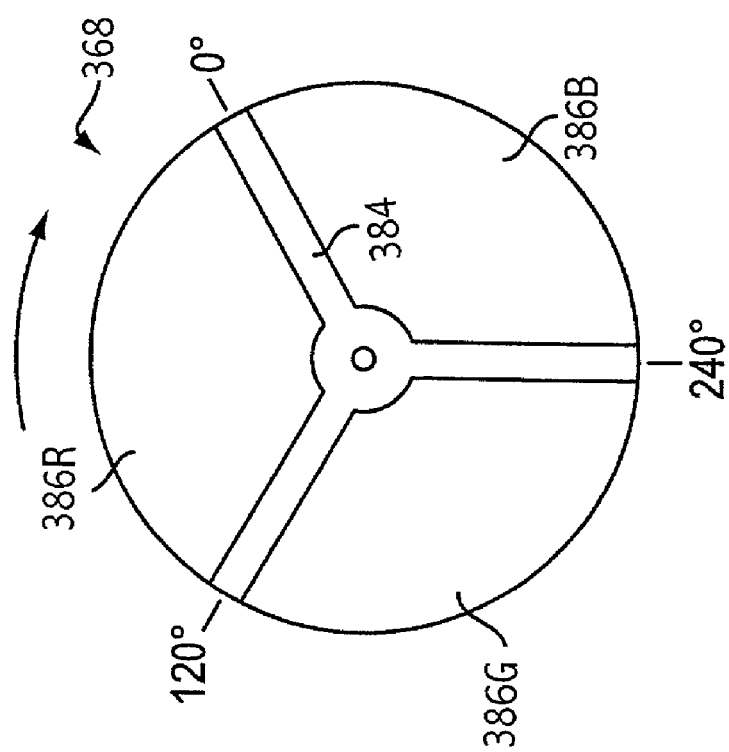
FIG. 13 illustrates a color wheel that is employed in the arrangement of FIG. 12.

Referring next to FIGS. 12 and 13 together, the color wheel 368 includes a frame 384 that supports a red filter 118R, a green filter 118G, and a blue filter 118B. The width of the arms of frame 384 will be generally ignored in what follows and, for convenience, it will be said that each of the colored filters provides a colored sector that extends (approximately) 120° The red sector begins at 0°; the green sector begins at 120°; and the blue sector begins at 240°. Motor control unit 372 generates angle information that is supplied to control unit 338 via a line 388. The angular information may be a train of pulses that are generated by a sensor (not illustrated) in the control unit 372, the sensor being linked to the motor's shaft. Once every revolution of color wheel 368, at the 0° mark, the motor control unit also generates a start-of-revolution signal (such as a long pulse) that is supplied to control unit e38 as part of the angular information. By counting pulses after the start-of-revolution signal, the control unit 338 is informed about which color sector is currently active, and how far that color sector has progressed.

The intensity register 364 in FIG. 12 receives a one-bit light intensity command signal from control unit e38 via a line 390, and the lamp driver unit 366 drives lamp unit 374 accordingly. The intensity command signal specifies either a low-light level (when the light-intensity command signal is 0), in which case only the low-intensity lamp 378 is driven, or a high-light level (when the light-intensity command signal is 1), in which case both the low-intensity lamp 378 and the high-intensity lamp 380 are driven to produce a total intensity of eight. The low-intensity lamp 378 is thus always on, while the high-intensity lamp 380 turns on and off.

The monitor unit 360 includes a light sensor 392 which senses the intensity of the light passing through color wheel 368, and generates a corresponding signal that is supplied to an amplifier 394 and thence to an analog-to-digital converter 396. The digital value of the sensed light intensity is then supplied to an integrator 398, which can be reset to zero by control unit 338 via a line 400. A light-level register 402 receives a multi-bit light-level integration value via a line 304 from control unit 338, and supplies it to a comparator 406, which sends a level-reached signal to control unit 338 via line 408 when the output of integrator 400 reaches the light-level integration value held in register 402. At this point, it is appropriate to note that the light intensity command that is received by register 364 is not the same as the light-level integration value that is received by register 402. The light intensity command indicates the instantaneous intensity that is desired—that is, whether only the low-intensity lamp 378 should be driven or whether the high-intensity lamp 380 should also be driven. The light-level integration value, in contrast, indicates the total amount or quantity of light that is desired, that is, the intensity times its duration.

Not yet mentioned in FIG. 12 is a bias and reset unit 410, which operates under the control of control unit 338 to supply the bias voltage and resonant reset pulses, as previously discussed. For purposes of the present invention, however, it is only necessary to consider the bias voltage, which is applied to array 356 to latch the micromirrors into their current positions as new data is being read into DMD 346, and is then temporarily relieved to permit the micromirrors to be moved into their new positions, whereupon the bias voltage is reapplied to latch the micromirrors at their new positions.

The operation of this embodiment will now be described with reference to FIG. 12 and the flowchart shown in FIGS. 14A and 14B. After one frame has been displayed, a new frame is stored in step 412 by transferring the red component of the new frame from memory 332 to memory 340, by transferring the green component of the new frame from memory 334 to memory 342, and by transferring the blue component of the new frame from memory 336 to memory 344. Memory 340, for example, stores video words corresponding in number and arrangement to the number and arrangement of micromirrors in the DMD 346. In this example, each of the video words has seven bits. Memories 342 and 344 are similar, except that they store video words for the green and blue components of the image.

Memory 340 for the red component is selected in step 414. A bit-rank counter (not illustrated) in control unit 338 is set to zero, meaning the least significant bits of the red component, in step 416. The least significant bits for the video words of the red component are then read into DMD 346 during step 422.

In step 420, a check is made to determine whether the color wheel 368 is positioned at the beginning of its red sector (that is, 0°). When the color wheel reaches the beginning of the color sector, control unit 338 loads a light-level integration value for the bit rank designated by the bit rank counter into the light-level register 402 (step 154). Since the bit rank counter was set at zero in step 416, the integration value loaded into register 402 during the first repetition designates the light level for exposing the pixels during display of the least significant bits. For convenience, this light level will be said to be "1" in arbitrary units. Then control unit 338 signals bias and reset unit 410 to latch the data read at step 418 into the DMD 346 (step 156). In the first repetition of the program's steps, the micromirrors thus move to their positions for displaying the least significant bits of the red component of the image. Control unit 338 resets integrator 398 to zero in step 426. Consequently, the integrator 398 starts integrating the signal from light sensor 392. Control unit 338 increments the bit rank counter in step 428, and then reads the bit rank designated by the bit rank counter (LSB+1 during the first repetition) into the DMD 346 during step 430.

At the conclusion of step 430, new data has been read into the memory cells of DMD 336, but the micromirrors are still latched at their old positions, and integrator 398 is still integrating toward the light-level integration value for the previous bit rank. When this integration value is finally reached (step 432), a check is made to see whether the bit rank counter has been incremented to a value greater than 2 (step 434). If not, the program returns to step 422, and register 402 is loaded with the light-level integration value for the bit rank designated by the bit rank counter. The micromirrors are then latched at step 424 in accordance with the bit rank read into the bit rank counter in step 430, and steps 426–432 ensue.

Figure 15:
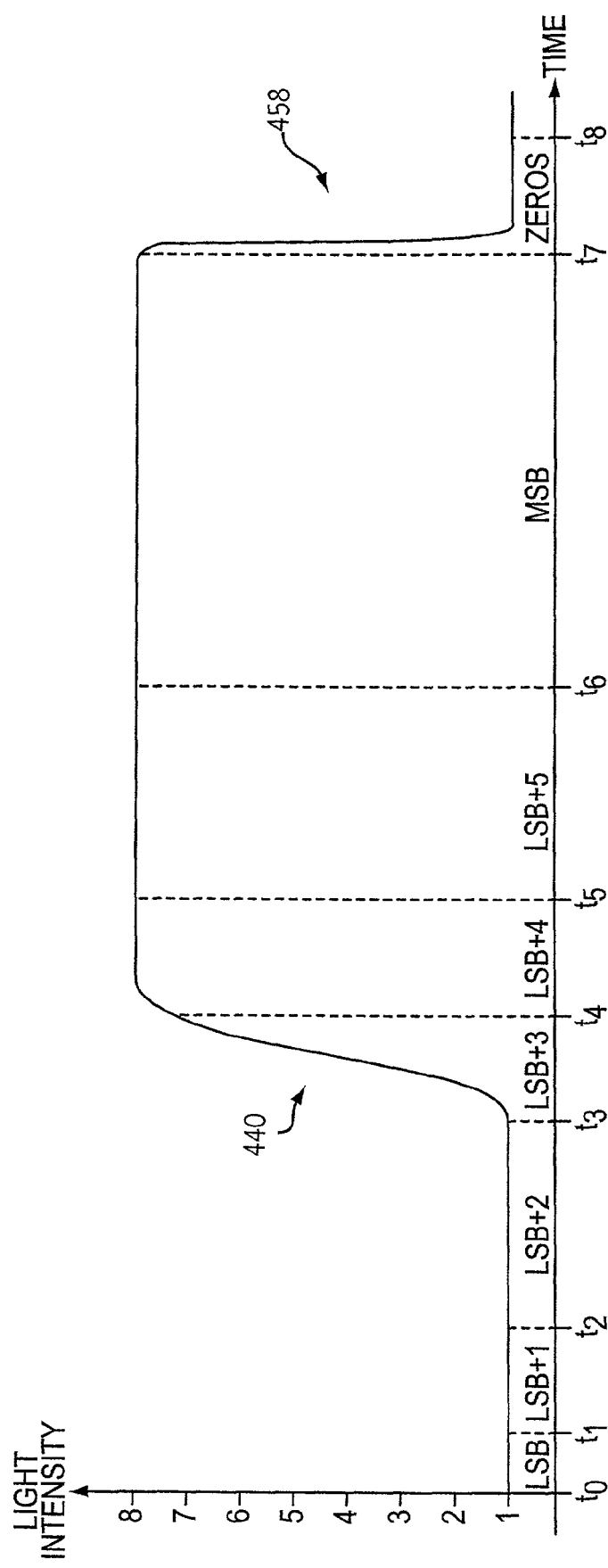
FIG. 15 is a graph showing an example of changing light intensities in the seventh embodiment.

In FIG. 15, the least significant bits of the video words of the red component are displayed during the period from $T_0$ to $T_1$. From the execution of step 412 until the return to step 412, the light intensity is 1 since low-intensity lamp 378 is always on. The next bits (LSB+1) are displayed during the period $T_1$ to $T_2$. They are displayed twice as long as the least significant bits because the light-level integration value for the second bits is twice as large as that for the least significant bits. The light-level integration value for the next bits, which are displayed from $T_2$ to $T_3$, is four times as large as that for the least significant bits, and therefore the pixels are exposed to light at intensity one during display of the third bits (LSB+2) for a period that is four times as long as the least significant bits.

Figure 14A:
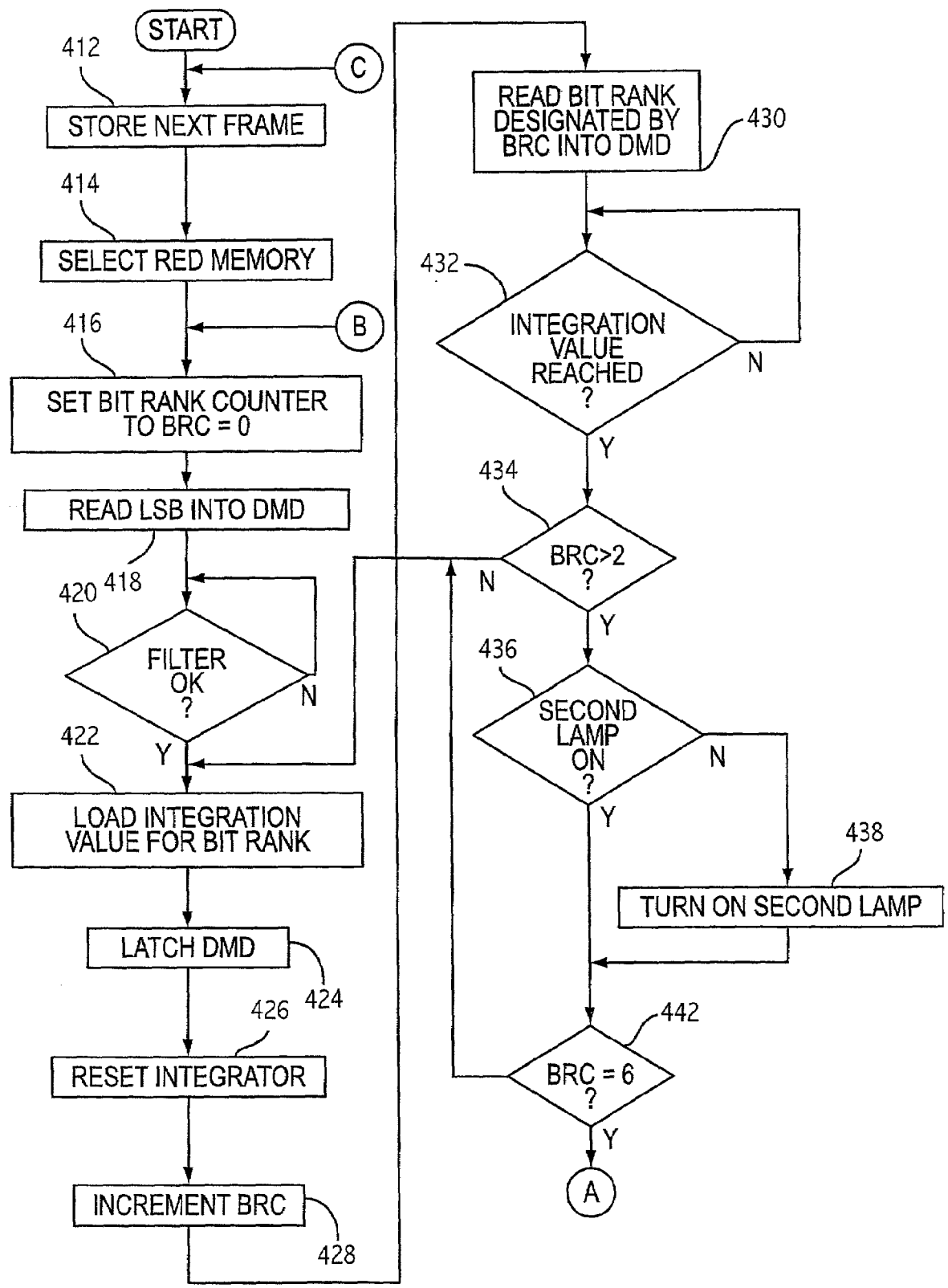
FIGS. 14A and 14B are flow charts for operation of the arrangement shown in FIG. 12 in accordance with the seventh embodiment.
Figure 14B:
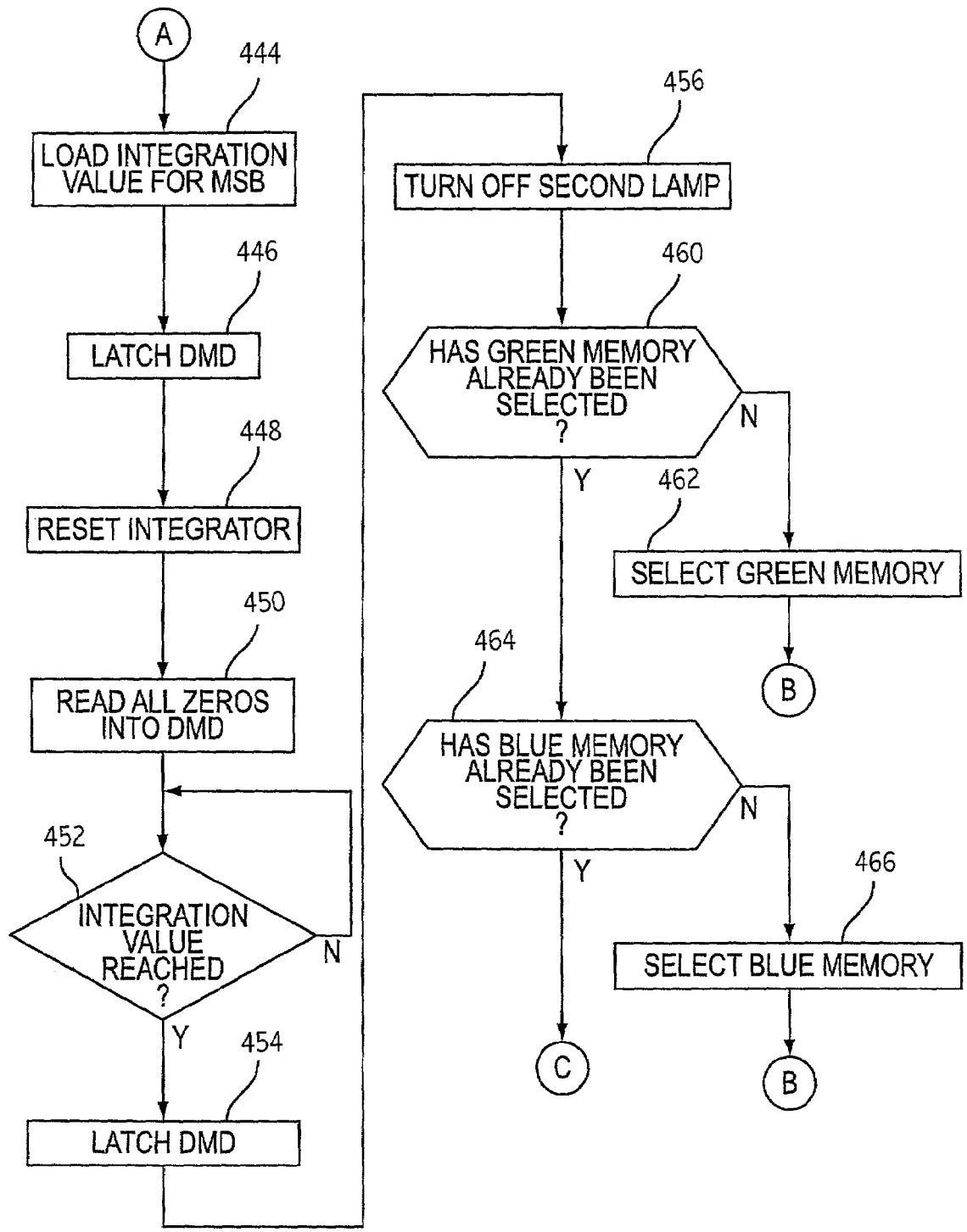

Returning now to step 432 in FIG. 14A, when the bit rank counter has been incremented to a value greater than two, a check is made at step 436 to determine whether the high-intensity lamp 380 has already been turned on. If not, it is turned on in step 438. FIG. 15 shows a transition region 440 when this occurs. The intention in FIG. 15 is not to show the actual turn-on behavior of lamp 380, which would depend upon the exact type of lamp and its age and upon the particular nature of driver unit 336, but rather to indicate schematically a build-up period before lamp 380 reaches its fill intensity. That is, the present invention does not demand a high-intensity lamp 380 that is capable of snapping full-on instantaneously. Rather, erratic or unruly behavior can be tolerated in transition region 440 (and, indeed, outside of the transition region) because the actual illumination is sensed and integrated.

A check is made at step 442 to determine whether the bit rank counter has been incremented to 6 (the most significant bit, since the video words have seven bits in this example). If not, the program returns to step 422, and LSB+3, LSB+4, and LSB+5 are displayed, as shown in FIG. 6. If the bit rank counter does indicate the most significant bit, however, the light-level integration value for the most significant bit is loaded into register 402 at step 444. The micromirrors are then latched into their positions for displaying the most significant bits of the red component in step 446, and integrator 398 is reset to zero in step 448. While integrator 398 is integrating toward the light-level integration value for the most significant bits, zeros are read into the DMD 346 (step 450). A zero indicates the off position for a micromirror. When the integration value for the most significant bits is reached (step 452), the micromirrors are latched at their off positions (step 454). The high-intensity lamp 380 is then turned off in step 456, leaving only the low-intensity lamp 378 illuminated. FIG. 15 shows a transition region 458 back to a light-intensity level of one. The changing light intensity in transition region 458 does not matter, since zeros are displayed during the period from $T_7$ to $T_8$.

The period from $T_7$ to $T_8$ is very important since it acts as a sponge to absorb variations in the turn-on behavior of high-intensity lamp 380 (transition region 440) and variations in the level attained by lamp 380 when it is fully on. As lamp 380 ages, for example, its intensity might change from seven times that of the low-intensity lamp 376 to six times the intensity of lamp 378, and this would alter the locations of the times $T_4$–$T_7$ in FIG. 15. The time $T_8$ needs to be set far enough down the time axis that $T_7$ does not overtake $T_8$ while the lamps are operating in accordance with their design specifications. The time between $T_7$ and $T_8$ when DMD 346 displays all zeros and is effectively off can be termed a "buffer period" which, in conjunction with the sensing and integration of the light impinging on DMD 346, absorbs variations in the light produced by lamp unit 374 and thus tolerates less than perfect behavior by lamp unit 374.

The display of the red component of the image is complete when step 454 is executed. The angle signal emitted to control unit 338 by motor control unit 372 at this point is less than 120°. The color wheel 368 continues turning during the buffer period between $T_7$ and $T_8$. At step 460, a check is made to determine whether memory 432 for the green component of the image has already been selected. If not, it is selected at step 462, and the program returns to step 416 to display these seven bits of the video words for the green component of the image. In the first repetition of the program's steps during the green display, the filter is deemed to be OK (step 420) at the beginning of green sector 386G (that is, when the color wheel reaches 120°). After the green component of the image has been displayed, a check is made at step 464 to determine whether the memory 344 for the blue component has already been selected. If not, it is selected in step 466, and the blue component is subsequently displayed (steps 416–454). If the memory 344 has indeed already been selected, the program returns to step 412 to display the next frame.

Although color wheel 368 is used in FIG. 12 to color the light from lamp unit 374 before the light impinges on DMD 346, the color wheel 368 could be used instead to color the light after reflection by the micromirrors. The sensor 392, however, should measure the light before impingement on the DMD 346 since it would otherwise be necessary to correct the sensed amount of light in accordance with the on/off states of the micromirrors.

The Eighth Embodiment

The eighth embodiment is also based on the structure shown in FIG. 12. This structure is controlled in a different manner, however, to reduce the frequency at which the high-intensity lamp 380 is turned on and off.

Figure 16:
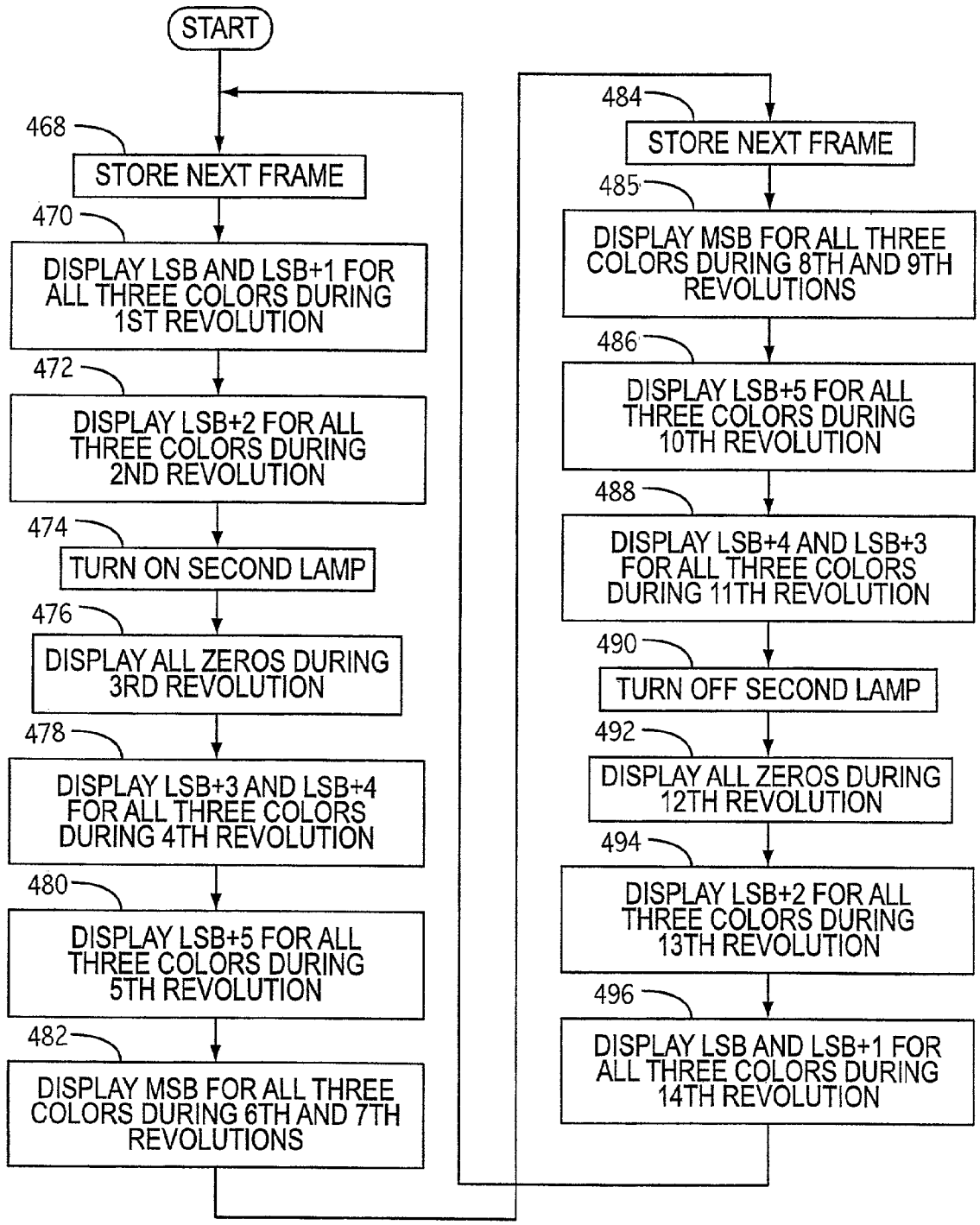
FIG. 16 illustrates a flow chart for operating the display apparatus shown in FIG. 12 in accordance with an eighth embodiment.

In FIG. 16, the red, green, and blue video words for the next frame are stored at step 468. Then, in step 470, the least significant bits and the next-to-least significant bits (LSB+1) are displayed for all three colors during a first revolution of the color wheel 368 (the details of step 470 will be described later with reference to FIG. 18A). This is shown schematically in FIG. 17A, which illustrates the three colored filters 386R, 386G, and 386B of the color wheel 368, and additionally indicates the angular segments through which the filters rotate during the display of the least significant bits and LSB+1. The cross-hatched regions in FIG. 17A indicate buffer periods during which the DMD 346 displays all zeros (that is, all of the micromirrors are in their off positions), and thus all of the pixels are dark. Only the low-intensity lamp 378 is on during the display of the LSB and LSB+1.

Figure 17A:
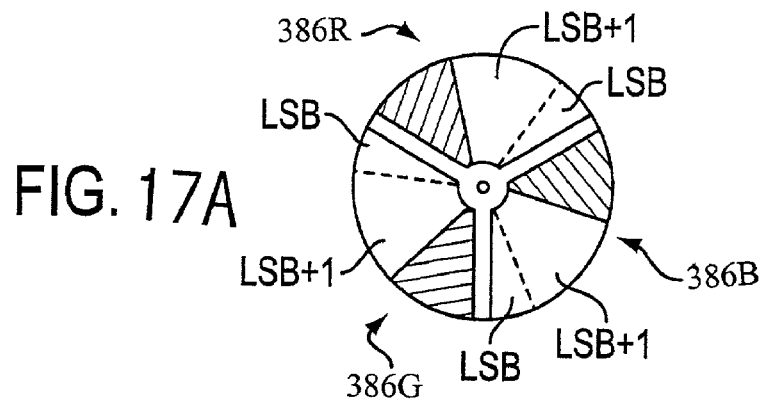
FIGS. 17A–17N schematically illustrate different bit ranks and buffer regions with respect to the color wheel while two full frames are displayed in accordance with the eighth embodiment during fourteen revolutions of the color wheel.
Figure 17B:
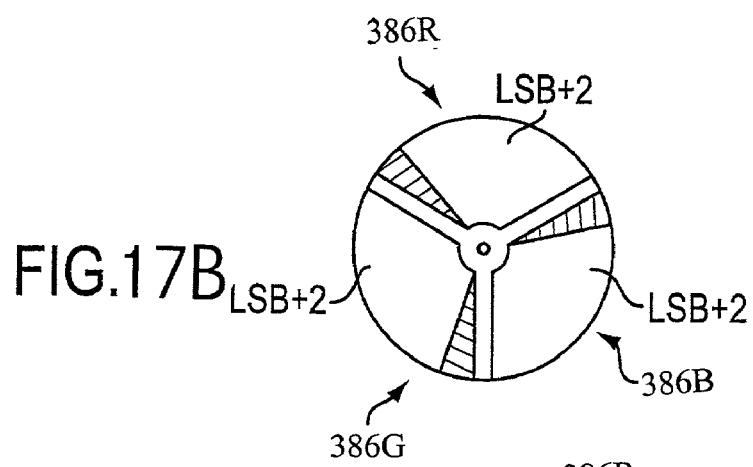

In step 472, the bits LSB+2 for all three colors are displayed during a second revolution of the color wheel 368, again with only the low-intensity lamp 378 being illuminated. This is shown in FIG. 17B. As before, the cross-hatched buffer periods in FIG. 17B indicate that the DMD 346 displays all zeros.

Figure 17C:
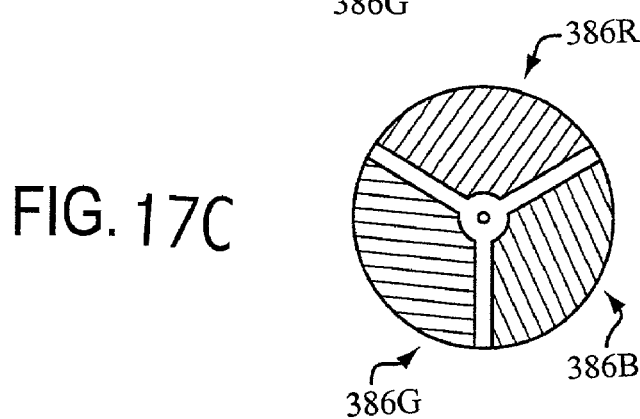
Figure 17D:
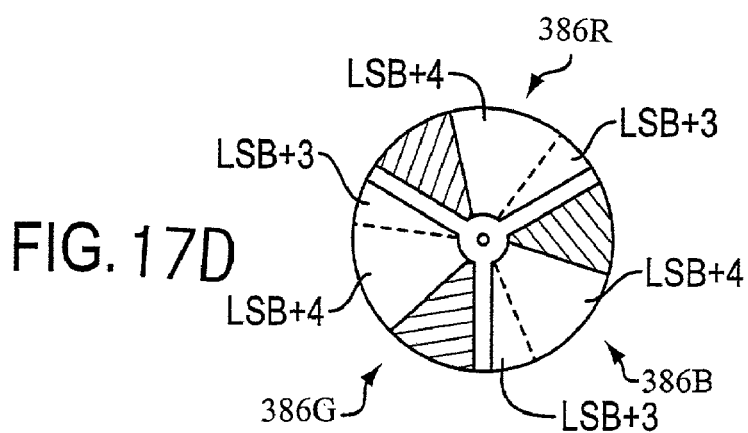

In step 474, the high-intensity lamp 380 is turned on, so that it shines along with the low-intensity lamp 378. As the intensity of lamp 380 rises, in the transition region 440 shown in FIG. 15, the DMD 346 displays all zeros (step 476) during a third revolution of color wheel 368. This is shown in FIG. 17C. Since the brightness of lamp 380 is selected to be seven times as great as that of lamp 378 when lamp 380 is fully on, the total intensity at the end of the third revolution is eight times as high as that during the first revolution (FIG. 17A). The display unit is now ready to display the LSB+3 and LSB+4 bits for all three colors during the fourth revolution (step 478). This is illustrated in FIG. 17D. The similarity between FIGS. 17D and 17A should be noted, with the difference being that the light is eight times as bright in FIG. 17D.

Figure 17E:
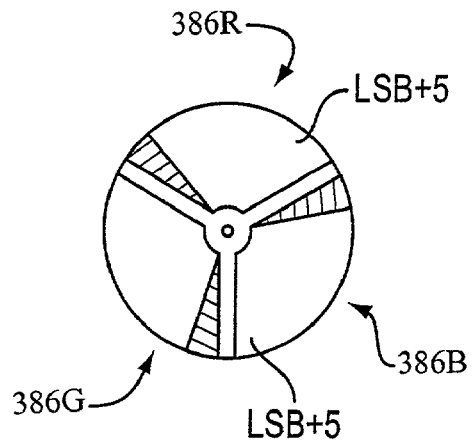

Next, in step 480, the bits LSB+5 are displayed for all three colors. This is shown in FIG. 17E, which corresponds to FIG. 17B except that the light intensity is eight times as high. It has previously been noted that the cross-hatched regions, when all of the micromirrors are in their off positions, are provided so that variations in the light intensity can be absorbed. In FIG. 17E, the size of the angular segments for displaying the LSB+5 bits has been selected so that these bits can be fully displayed using (for example) four-fifths of each colored filter when each of the lamps 378 and 380 is shining at its design brightness. This leaves one-fifth of each colored filter (i.e., the cross-hatched buffer regions in FIG. 17E) to absorb variations if the intensity of either or both lamps falls to its lowest acceptable level as a result of aging, etc.

Figure 17F:
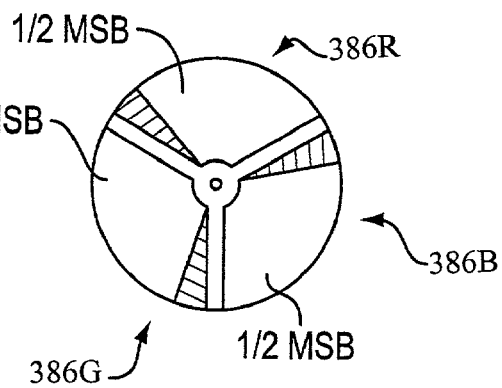
Figure 17G:
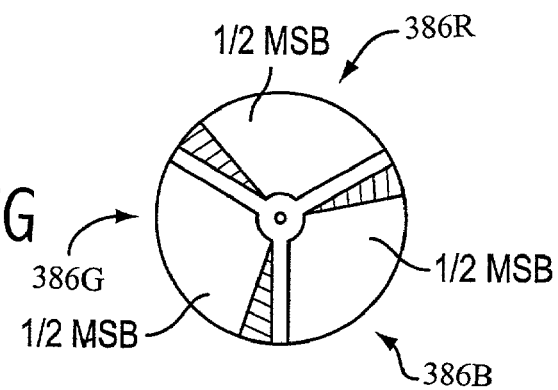
Figure 17H:
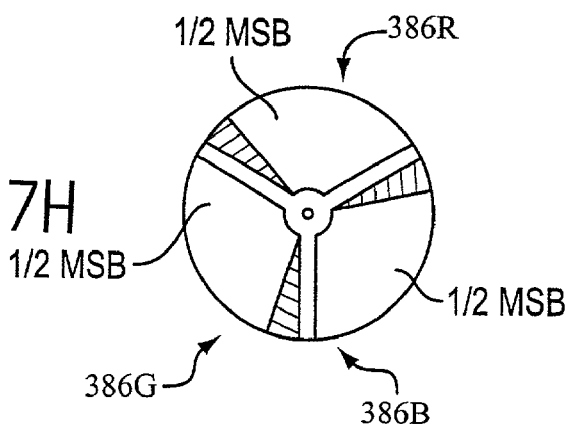
Figure 17I:
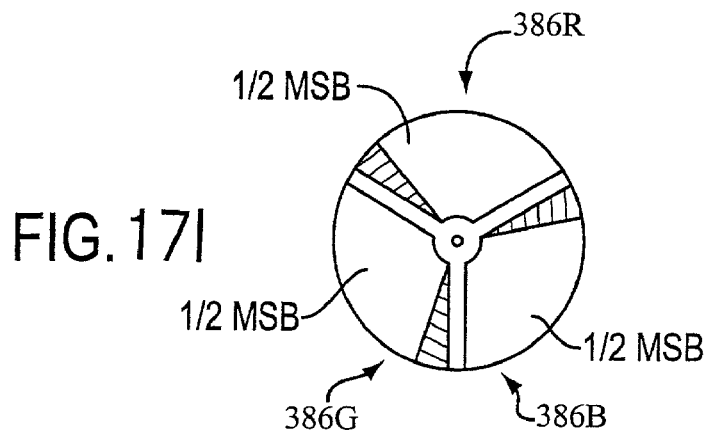
Figure 17J:
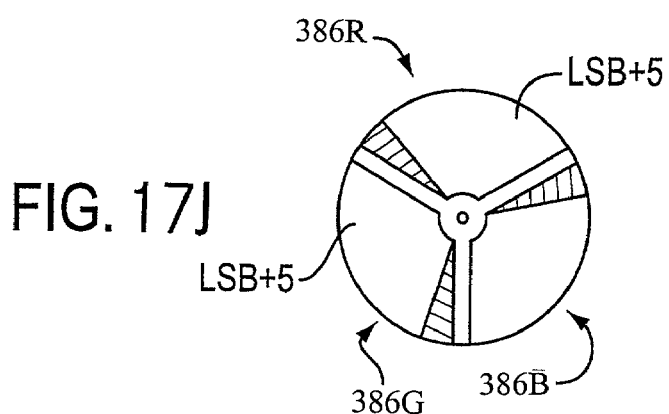
Figure 17K:
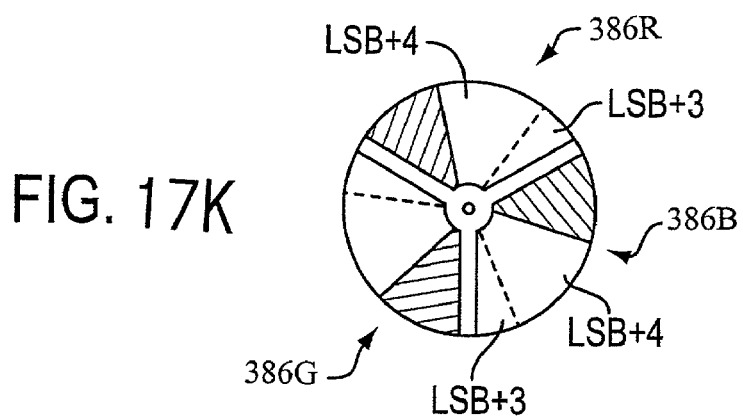

The most significant bits (LSB+6) for all three colors are displayed in the sixth and seventh revolutions (step 482), as shown in FIGS. 17F and 17G. The next frame is then stored (step 484), and the most significant bits for all three colors are displayed during the eighth and ninth revolutions of the color wheel 368 (step 486). This is shown in FIGS. 17H and 17I. The bits LSB+5 for all three colors are then displayed during the tenth revolution of the color wheel 368 (step 486), as shown in FIG. 17J. Thereafter, the bits LSB+4 and LSB+3 are displayed during the eleventh revolution (step 488), as shown in FIG. 17K.

The high-intensity lamp 112 is turned off in step 350, and the DMD 346 displays all zeros (step 492) during the twelfth revolution (FIG. 17L) as the light level falls to one-eighth of its previous value in the transition region 458 (FIG. 15). With only the low-intensity lamp 378 on, the bits LSB+2 for all three colors are displayed in step 494 during the thirteenth revolution (FIG. 17M), and the bits for the LSB and LSB+1 for all three colors are displayed during the fourteenth revolution (step 496; FIG. 17N). At this point, the program returns to step 468 to store the next frame.

From the foregoing, it will be apparent that, in this embodiment, the video words for the red, green, and blue components for an image frame are not all displayed during a single revolution of the color wheel 368. Instead, the bits of the video words are displayed during a sequence of revolutions and, moreover, more than one revolution is devoted to displaying the most significant bits. The DMD 346 displays all zeros during a full revolution of the color wheel during the transition region 171 after the high-intensity lamp 112 has been turned on and during the transition region 187 after it has been turned off. A particular advantage of this embodiment is that the high-intensity lamp 112 only needs to be turned on and off once every two frames, or 30 times a second if the frame repetition rate is 60 frames per second.

Figure 17L:
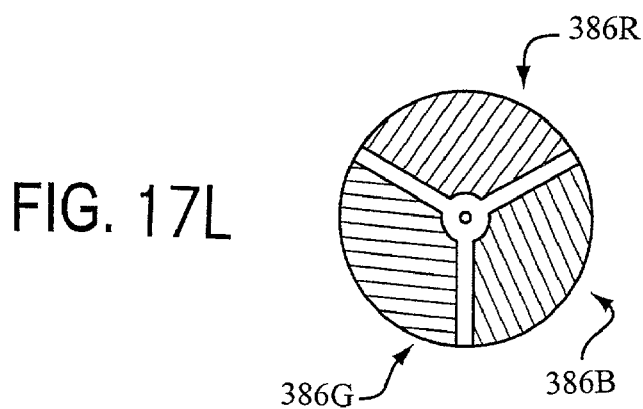
Figure 17M:
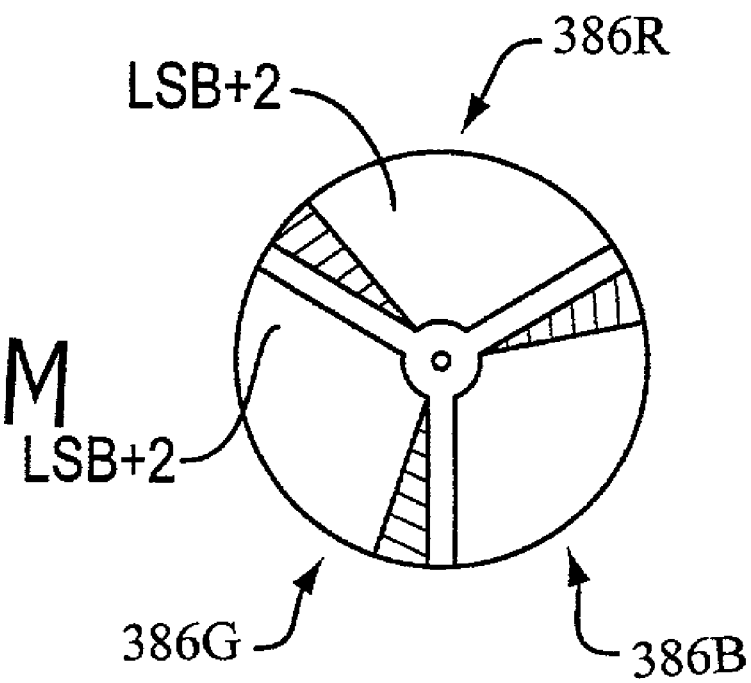
Figure 17N:
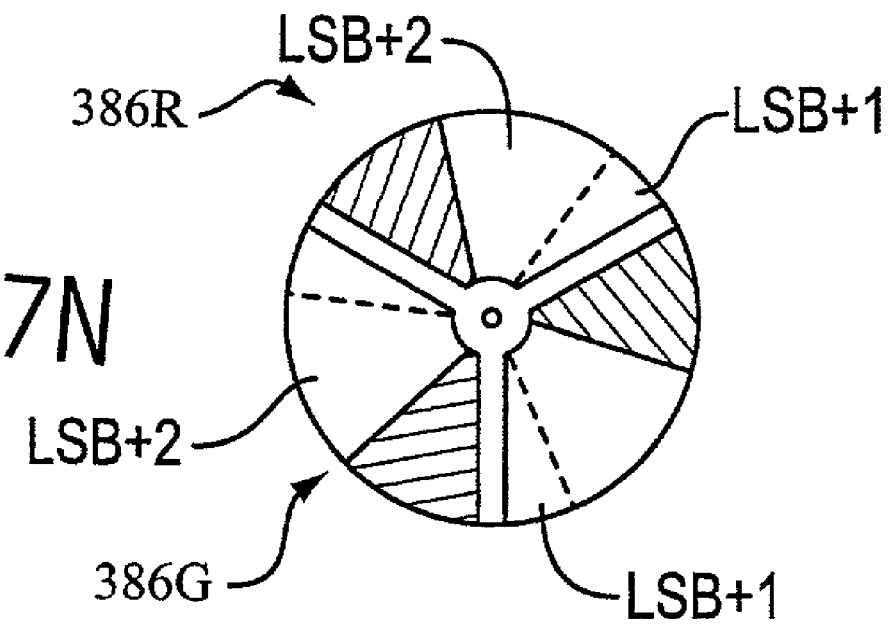

In the described embodiment, the DMD 46 displays all zeros for a full revolution of the color wheel during transition region 440, as shown in FIG. 17C, and for a full revolution during transition region 458, as shown in FIG. 17L. Depending upon the rise time and fall time of lamp 380, full revolutions may not be needed. For example, if the intensity of lamp 380 falls very rapidly, FIG. 17L could be omitted altogether. With a fairly rapid descent, it might be necessary to display all zeros only during the red filter, but it would then be necessary to complicate the program by starting up again after the all-zeros sector with the green filter for the LSB+2 bits, followed by the blue and red filters for the LSB+2 bits. Similar comments apply with respect to FIG. 17C and the transition region 440, with the added observation that it would be possible to display all zeros for more than one revolution if the rise time of the lamp 380 selected is sufficiently long or turbulent to warrant this.

Figure 18A:
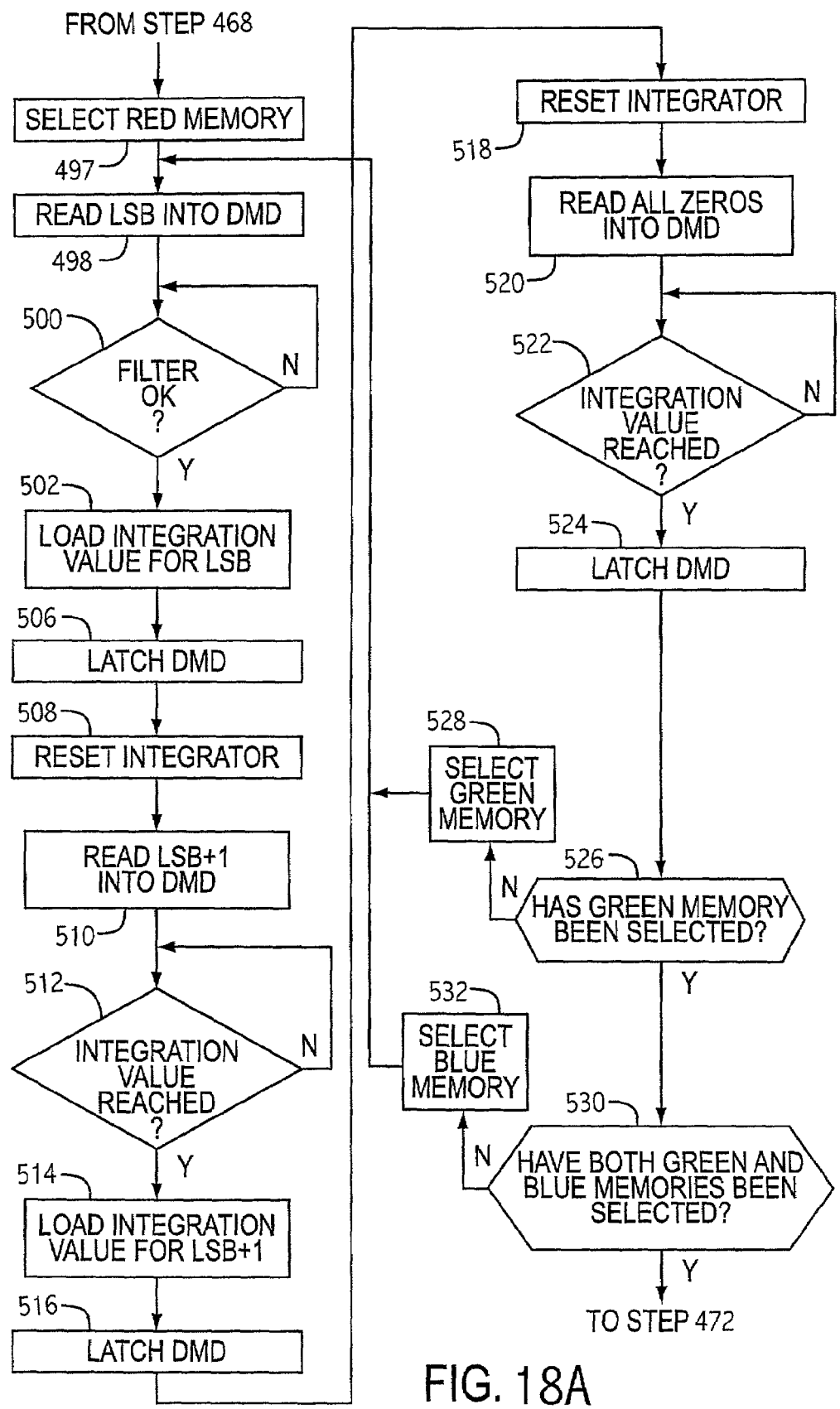
FIGS. 18A–18C are flow charts which illustrate three of the steps in FIG. 16 in more detail.

The details of step 470 are illustrated in FIG. 18A. The red memory 340 (FIG. 12) is selected in step 496, and the least significant bits of the red video words stored in memory 340 are read into DMD 346 in step 298. At step 500, a check of the angle information is made to determine whether the color wheel 368 is positioned at the beginning of the red filter 386R. If so, the light-level integration value for the least significant bit is loaded into the light-level register 402 during step 502, and the least significant bits that were read into the DMD 346 during step 298 are latched at step 506. Integrator 398 is reset to zero during step 508 and begins integrating toward the light-level integration value that was loaded in step 502. In step 510, the next-to-least significant bits (LSB+1) of the video words stored in the selected memory are read into DMD 346. When the integration value that was loaded in step 502 is reached (step 512), the light-level integration value for the LSB+1 bits is loaded into register 402 (step 514). The LSB+1 bits that were read into the DMD 346 at step 510 are then latched into the DMD during step 516, so that the DMD stops displaying the LSB bits from the selected memory, and begins displaying the LSB+1 bits. Integrator 398 is reset during step 518, and begins integrating toward the integration value that was loaded into light-level register 402 during step 514. Then, during step 52, all zeros are read into DMD 340, while the micromirrors of the DMD 46 remain latched in accordance with the LSB+1 bits. When the integration value is reached, step 522, the zeros that were read into the DMD at step 520 are latched in step 524. The DMD thus starts displaying one of the hatched buffer regions in FIG. 17A.

A check is made at step 526 to determine whether the memory 342, which stores the video words for the green component of the image, has already been selected. If not, the green memory 342 is selected during step 528, and the process returns to step 498 to read the least significant bits of the green component into DMD 346. If the memory 342 has already been selected, a check is made at step 530 to determine whether the memory 344, which stores the video words for the blue component, has already been selected. If not, it is selected in step 532. If the blue memory has already been selected, the process continues to step 472 (FIG. 16) to display the LSB+2 bits of the three colors.

Figure 18B:
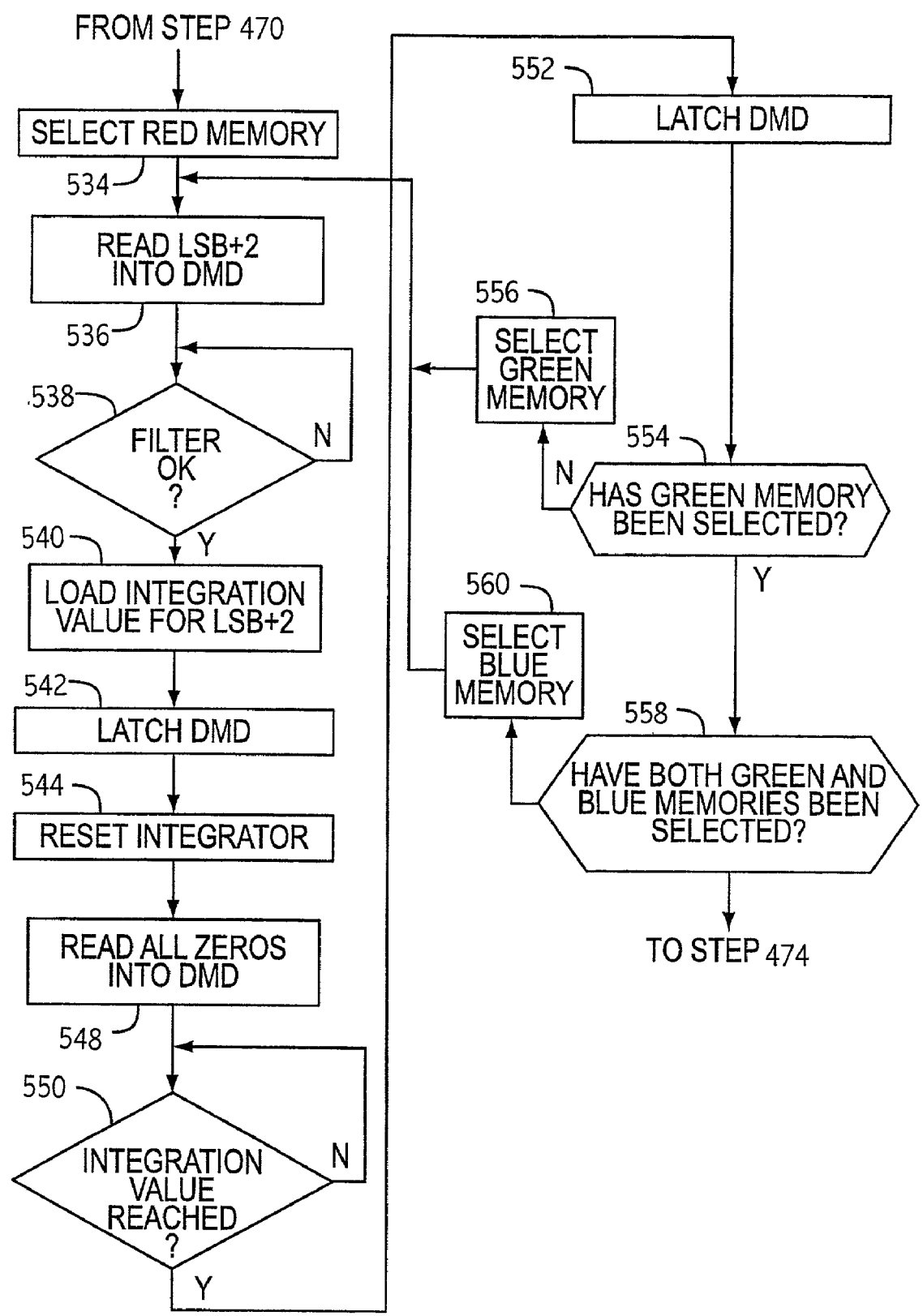

The details of step 474 are shown in FIG. 18B. At step 534, the memory 340, which stores the video words for the red component, is selected. The LSB+2 bits of the video words in the selected memory are read into DMD 346 during step 536, and a check is made a step 538 to determine whether the color wheel 368 is positioned at the start of the filter for the selected color. The control unit 338 loads the light-level integration value for the LSB+2 bits into light-level register 402 during step 540, and the LSB+2 bits are latched into DMD 346 during step 542. This begins the display of the LSB+2 bits of the selected color. The integrator 398 is immediately reset to zero during step 544, and begins integrating toward the light-level integration value that was loaded during step 540. All zeros are read into DMD 346 during step 548 while the DMD continues displaying the LSB+2 bits that were latched in step 542. After the integration value is reached during step 550, however, the zeros are latched into the DMD in step 552, resulting in one of the cross-hatched buffer regions shown in FIG. 17B. A check is made at step 554 to determine whether the memory 342, which stores the video words for the green component, has already been selected, and, if not, it is selected during step 556. With the DMD continuing to display all zeros, the LSB+2 bits for the green component are read into the DMD during step 536, the position of the color wheel 368 is checked during step 538 to determine whether the beginning of the green filter 386G has been reached, and, if so, the integration value for the LSB+2 bits is loaded in step 540. The LSB+2 bits are then latched into the DMD in step 542, whereupon the DMD stops displaying all zeros and begins displaying the LSB+2 bits of the green component.

If the memory 342 for the green component has already been selected when the check at step 554 is conducted, a further check is conducted at step 558 to determine whether the memory 344 for the blue component has also already been selected. If not, it is selected during step 560 and the process returns to step 536.

Figure 18C:
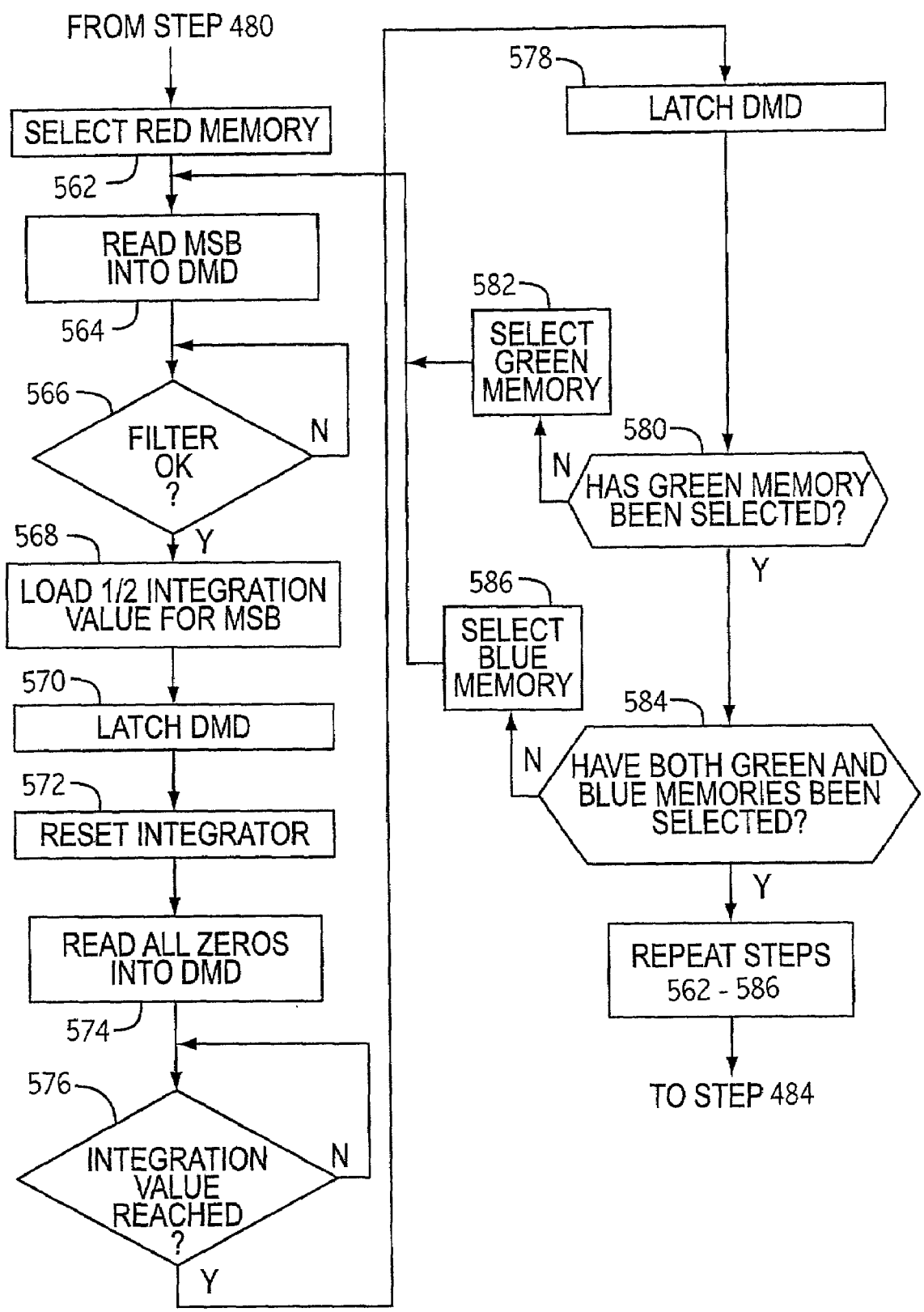

The details of step 482 (FIG. 16) will now be described with reference to FIG. 18C. The memory 340 which stores the video words for the red component is selected in step 562. The most significant bits of the video words in the selected memory are read into DMD 346 in step 564, and then a check is conducted at step 566 to see whether the color wheel 368 is positioned at the beginning of the filter 386r for the selected color. Since the light-level integration value for the MSB is too large to be reached during a 120° rotation of the color wheel 368, the control unit 338 loads half of the integration value into light-level register 402 during step 568. The most significant bits are then latched into DMD 346 during step 570, thus beginning their actual display. The integrator 398 is immediately reset to zero during step 572, and begins integrating toward the value loaded in step 568. Zeros are read into all locations of the DMD 346 during step 574 and, after the integration value loaded at step 568 (that is, one-half the light-level integration value for the MSB) has been reached, step 576, the zeros read in at step 574 are latched into the DMD at step 578, thereby turning all of the pixels off. This corresponds to one of the cross-hatched buffer regions in FIG. 17F. A check is made at step 580 to determine whether the memory 342 for the green component has been selected, and, if not, it is selected at step 582 and the process returns to step 564. If the green memory 342 has already been selected, however, a check is made at step 584 to determine whether the memory 344, which stores the video words for the blue component, has also already been selected. If not, it is selected at step 586, and the process returns to step 564. If the blue memory 344 has already been selected, steps 582–586 are repeated during the next revolution of the color wheel 368 in order to complete the display of the most significant bits of the red, green, and blue components.

The Ninth Embodiment

An advantage of the seventh and eighth embodiments is that the light level when the higher-order bits of the video words are displayed is relatively high, so that the higher-order bits can be displayed in a reasonably short period of time. When the lower-order bits are displayed, the light level is relatively low, so that these bits need not be displayed at a speed that unduly taxes the circuitry. Using a reduced light level when the lower-order bits are displayed means that more time is available for reading them into the DMD than would be the case if all of the bit ranks were displayed at the same light level. In the sixth and seventh embodiments, different light levels were attained by using a lamp unit 374 having a low-intensity lamp 378 that was permanently illuminated and a high-intensity lamp 380 that was turned on when the higher-order bits were displayed. Another way of achieving different light levels would be to use a single lamp, which is controlled so as to emit different light levels as needed. This possibility will be discussed in more detail later with reference to FIG. 14.

The ninth embodiment, however, achieves different light levels without multiple lamps and without a lamp that is driven at different emission levels. In the eighth embodiment, the lamp unit 374 in FIG. 12 is replaced by a single lamp (not illustrated) having a constant light output, and lamp-driver unit 366 and intensity register 402 are unnecessary.

Figure 19:
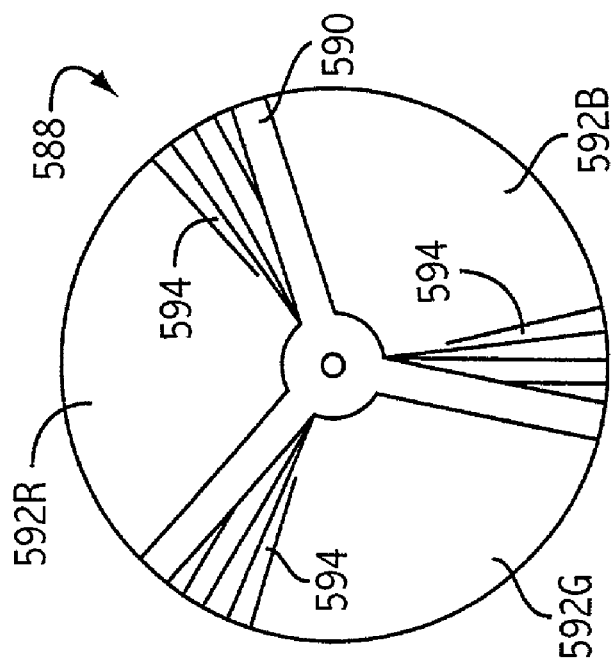
FIG. 19 illustrates a color wheel combined with attenuation regions to reduce the light intensity during display of the lower-order bits.

FIG. 19 illustrates a color wheel 588 having a frame 590 which mounts a red-color filter 592R, a green-color filter 592G, and a blue-color filter 592B. The initial portion of each of these filters has a light-attenuating region 594 which reduces the intensity of the light emitted by the lamp. As a result, when the color wheel 588 is positioned at the initial portion of any of the filters, the signal from sensor 392 in FIG. 12 is reduced and consequently it takes longer for integrator 398 to integrate to the light-level integration value stored in register 402. This lengthens the time available for displaying the lower-order bits, and thus also the time available for reading the lower-order bits into the DMD.

In FIG. 19, the attenuation regions 594 are integrated with the color filters in a single color wheel 588, but if desired, an attenuation filter wheel that is separate from the color wheel could be used.

Moreover, in lieu of attenuation regions either on the color wheel or a separate wheel, a ferroelectric LCD could be used to selectively control the level of light emitted by a single, constant-output lamp (or a plurality of lamps which together produce a constant output). One possibility would be to use an LCD having rows that are all on during display of the MSB, with half of the rows being on during display of the next-to-most significant bit, a fourth of the rows being on during display of the next bit, and so forth. Another possibility would be to use a single ferroelectric liquid crystal cell which is pulse-width modulated to provide binary attenuation levels.

The Tenth Embodiment

Figure 23:
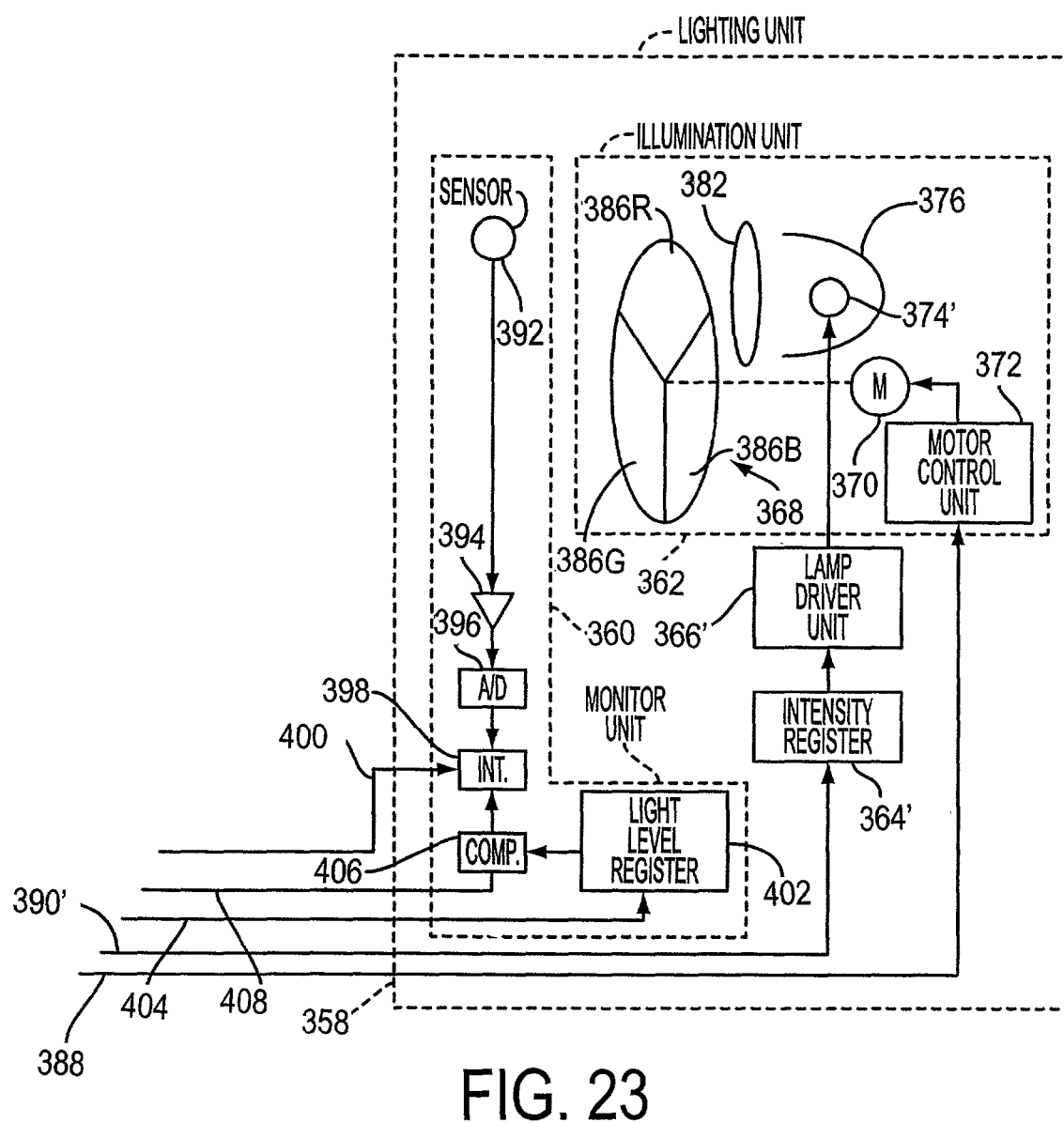
FIG. 23 illustrates a lighting unit in which the lamp unit has only one lamp, rather than two lamps as in FIG. 12.

FIG. 23 illustrates a lighting unit 358' that is modified with respect to the lighting unit 358 in FIG. 12. Like lighting unit 358, lighting unit 358' includes a monitor unit 360. However, illumination unit 362', intensity register 364', and lamp driver unit 366' differ from the corresponding elements of lighting unit 358.

The illumination unit 362' is different in that its lamp unit 374' consists of a single lamp. It is driven at different binary levels by a lamp driver unit 366' in accordance with a multi-bit light-intensity command that is received by intensity register 364' via a bus 390'. The light-intensity command may designate two levels, a low level and a high level with eight times the intensity of the low level, as in the first embodiment. In such a situation, the light-intensity command for the low level would be 0001 and the light-intensity command for the high level would be 1000. Alternatively, the light-intensity command may designate a number of different binary light intensities. One possibility would be a straight progression (0 . . . 01, 0 . . . 10, 0 . . . 11, 1 . . . 11), in which case every bit rank of the video words would have its own intensity. Another possibility would be to use the same light intensity for pairs of bits in the video words. In accordance with this possibility, the light-intensity command would be 0 . . . 01 for both the least significant bit and LSB+1 of the video words, with the exposure being longer for LSB+1. For LSB+2 and LSB+3, the light-intensity command would be jumped to 0 . . . 10, with the exposure being longer for LSB+3 than for LSB+2. Thereafter, the light-intensity command would be jumped again, and so forth. It will be apparent that the same light-intensity command could also be used for triplets of bits in the video words, etcetera. Using the same light-intensity command for pairs, triplets, etc. of the video words may be desirable if the lamp that is used requires a relatively long period for stabilization when the light intensity is changed.

Instead of using a lamp unit 374' with a single lamp, the lamp unit could have two or more lamps that are driven in unison at energy levels that change during different time periods. One example would be a lamp unit with two lamps that are connected in parallel, in lieu of the single lamp shown in FIG. 23.

The Eleventh Embodiment

The prior embodiments have been directed to arrangements in which all of the displayed pixels are updated simultaneously, by reading bit values into a DMD while the micromirrors are latched with a bias voltage and by then momentarily removing the bias voltage so that the micromirrors can respond to electrostatic forces corresponding the new bit values and move to their new positions. The present invention, however, is not limited to displays which can be updated simultaneously; instead, in the present embodiment, the bits that are to be displayed are updated row-by-row. Although the techniques employed in this embodiment are applicable to DMDs, they will be explained using an example in which the addressable spatial light modulator is a ferroelectric liquid crystal display panel. Such a panel is comprised of bi-stable pixels or cells, meaning that they are either on or off without intermediate gray levels, and the cells respond very quickly to applied signals.

Figure 20:
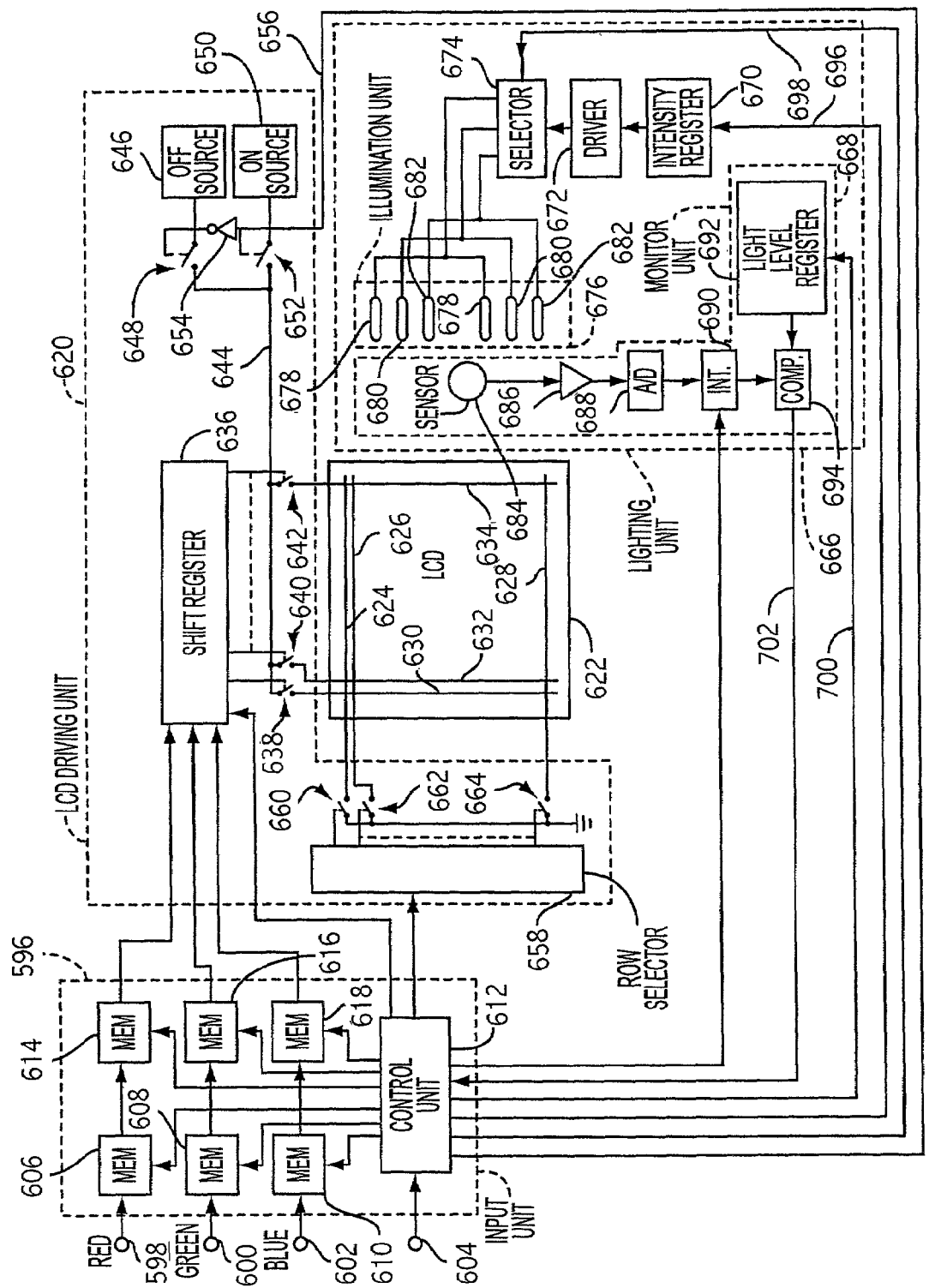
FIG. 20 is a block diagram of a display apparatus in which the spatial light modulator is a ferroelectric LCD which is addressed with video information on a row-by-row basis.

In FIG. 20, an input unit 596 has an input terminal 598 for receiving a digitized signal for the red component of an image, an input terminal 600 for receiving a digitized signal for the green component, an input terminal 602 for receiving a digitized signal for the blue component, and an input terminal 604 for receiving a synchronization signal. The digitized signals for the red, green, and blue components consist of seven-bit video data words, so that each video word specifies one of 128 levels of red, green, or blue intensity for a point that is to be displayed. The video words for the red, green, and blue components are stored in respective frame memories 606, 608, and 610 under the control of a control unit 612. When a full frame is stored, control unit 612 transfers the contents of memories 606–610 to further frame memories 614, 616, and 618, and then begins storing the next frame in memories 606–610. Control unit 612 also reads out the contents of memories 614–618 to an LCD driver unit 620, which addresses a ferroelectric LCD panel 622 with data from memories 614–618.

The ferroelectric LCD panel 622 has row electrodes and column electrodes which cross, with liquid crystal material between them, to provide a matrix of pixels having rows and columns. The row electrodes include a first row electrode 624, a second row electrode 626, and so on, to a last row electrode 628. The column electrodes include a first column electrode 630, a second column electrode 632, and so on, until the last column electrode 634.

LCD driving unit 620 includes a shift register 636 having the same number of stages as there are column electrodes in LCD panel 622. The first stage is connected to an electrically controlled switch 638, the second stage is connected to an electrically controlled switch 640, and so on until the last stage, which is connected to an electrically controlled switch 642. A switch is closed if its corresponding shift register stage contains a one, and it is open if the corresponding stage contains a zero. All of the switches are connected to a line 644. Driving unit 620 also includes an OFF voltage source 646 which can be connected by an electrically controlled switch 648 to the line 644, and an ON voltage source 650 which can be connected by an electrically controlled switch 652 to the line 644. An inverter 654 is connected to a line 656 from the control unit 612. When line 656 carries a zero, switch 652 is open and switch 648 is closed. On the other hand, when line 656 carries a one, switch 652 is closed and switch 648 is open. Thus, the signal on line 656 controls whether OFF source 346 or ON source 350 is connected to line 644.

The LCD driving unit 620 also includes a row selector 658. It has stages which can be strobed to sequentially close an electrically controlled switch 660 that is connected to first row electrode 624, an electrically controlled switch 662 that is connected to the second row electrode 626, and so on to a switch 644 that is connected to the last row electrode 628. Each of the switches, when closed, connects the corresponding row electrode to ground. When the switches are open, the row electrodes are left electrically floating.

FIG. 20 also illustrates a lighting unit 666 which includes a monitor unit 668, an intensity register 670, a lamp driver unit 672, a color selector 674, and an illumination unit 676. Physically, the illumination unit 676 is disposed behind LCD panel 622, with a light diffusion plate (not illustrated) being inserted between the illumination unit 676 and the LCD panel 622 in order to spread light emitted by the illumination unit 676 evenly on the back of LCD panel 622. The illumination unit includes red fluorescent lamps 678, green fluorescent lamps 680, and blue fluorescent lamps 682. Although only two lamps for each color are illustrated, more may be included if this is desirable to provide even illumination of the back of LCD panel 622 for each color.

The monitor unit 668 includes a sensor 684 which is positioned to sense the light emitted by illumination unit 676, an amplifier 686 which amplifies the signal generated by sensor 684, an analog-to-digital converter 688 which converts the amplified sensor signal to a digital value, an integrator 690 which repeatedly adds the digital signal in order to integrate it, a light-level register 692, and a comparator 694 which compares the output of register 694 with the output of integrator 690.

The control unit 612 emits a one-bit light-intensity command on line 696 to the light intensity register 670. When the light-intensity bit is zero, this indicates that driver 672 is to drive illumination unit 676 so that it emits a low-light level. When the light intensity bit is high, illumination unit 676 is driven to emit a high-intensity level having a magnitude that is eight times the low-intensity level. A two-bit color selection signal emitted by control unit 612 on bus 698 indicates which color light should be selected by selector 674. When the color selection signal is 00, selector 674 connects driver 672 to the red lamps 678. When the color selection signal is 01, selector 674 connects driver 672 to the green lamps 680. When the color selection signal is 10, the blue lamps 682 are selected.

Control unit 612 emits a multi-bit light-level integration signal to light-level register 692 via a bus 700. Register 692 supplies the light-level integration signal to the comparator 694, whose output to control unit 612 on line 702 is zero as long as the-integrated value from integrator 690 is smaller than the light-level integration signal. When the integrated value reaches the value of the light-level integration signal, comparator 694 supplies a one on line 702 to signal control unit 612.

Before describing the operation of the arrangement shown in FIG. 20, it would be useful to explain how ferroelectric LCD panel 622, with its bi-stable (on or off) liquid crystal cells, can be used to achieve a gray scale. The explanation will be provided by way of analogy to a room having a window with Venetian blinds, the blinds having 60 slats that can be opened or closed. Typically, the slats of Venetian blinds are linked so that they are all opened or closed together, but in the following discussion, it will be assumed that the slats can be opened or closed individually.

Suppose that it is noon on a cloudless day, so that the illumination outside the room is constant and does not fluctuate, and that all 60 of the slats are initially closed so that no light enters through the window. If we open the top slat (slat number 0), light begins streaming through. After a predetermined time delay period, we open the next slat (slat number 1) and light begins streaming through it, too. After two times the predetermined delay period, we open the next slat (number 2), and so on, until the bottom slat (number 59) is opened. By the time the bottom slat has been opened, light has been streaming through the top slat for a period of time that is equal to the predetermined delay period times 59. Light has been streaming through the next-to-top slat (slat number 1) for a period of time equal to the predetermined delay times 58, and so forth. One delay period after the bottom slat has been opened, we close the top slat; the total amount of light passing through the top slat while it was opened is thus proportional to 60 slats times the delay period. After another delay period, we close the next-to-top slat; the total amount of light passing through it while it was open is also proportional to 60 times the delay period. The slats are thus closed in sequence in this way, and by the time the bottom slat is closed, the total amount of light that passed through it will again be proportional to 60 times the delay period.

It should be noted that it is not necessary to start the slat-closing sequence immediately after the slat-opening sequence has been completed. When all the slats are opened, the light through each of them is the same. All that is necessary for a constant amount of light through each of the slats when the outside illumination does not fluctuate is that they are opened in sequence at some particular speed and later closed in sequence at the same speed.

Now, consider the case in which the outside illumination level is not constant, but fluctuates instead. Suppose we are back in our room with the Venetian blinds at dawn, as the sun is rising and the external light level is thus increasing. If we were to open the slats from top to bottom and then close them from top to bottom at the same speed, the result would be more light through the bottom slat than the top slat. The reason is that it would grow brighter outside during the time between the top slat being opened and the bottom slat was opened, and it would also grow brighter outside during the time between the top slat being closed and the bottom slat being closed. But suppose that, when the top slat is opened, we begin integrating the light that passes through it. When the integrated light reaches a predetermined value, which will be called an "integration increment Δ," we open the second slat. Light is now streaming through both the first slat and the second slat at the same rate. By the time the integrated amount of light through the first slat has reached two times the predetermined integration increment Δ, the integrated amount of light through the second slat will reach one times Δ, and we open the third slat. This opening process continues to the bottom slat, with the time delay between one slat and the next growing shorter because the light intensity outside is increasing. By the time the bottom slat (number 60) is opened, however, the total amount of light that has entered the room via the top slat is proportional to 59 times the integration increment Δ. If we now begin closing the slats in sequence from the top to the bottom, in accordance with the integrated amount of light, the amount of light that entered through each slat will be the same as the amount that entered through every other slat. Furthermore, instead of starting the closing sequence immediately after the opening sequence has been completed, we can allow light to enter through all of the slats for any amount of time that is needed, and then sequentially close them in accordance with the integrated light value and still wind up with a constant amount of light through each of the slats while they were open.

Enough of Venetian blinds. It is time to return to the arrangement shown in FIG. 20. An overview of the operation of this arrangement will now be presented, followed by a more detailed discussion.

Assume that an old frame has just been displayed and all of the cells or pixels of LCD panel 622 are off. Also assume that the red lamps 678 have been selected and are being driven at the low level. Control unit 612 emits a one on line 656, thus closing switch 652 and connecting ON source 650 to line 644. Control unit 612 also reads out a row's worth of the least significant bits (LSB) of the red component of the new frame from memory 614 to shift register 636. Depending on the contents of the row, switches 638–642 may open and close as the row is being shifted into register 636, but this has no influence since all of the row electrodes 624–628 are floating. After the row has been completely shifted in, the switches 638–642 have states corresponding to the values of the least significant bits of the first row of the red component. Control unit 612 then causes row selector 658 to strobe the first row switch 660, thereby connecting the first row electrode 624 to ground. At this point, cells in the top row of LCD panel 622 will be turned on by ON source 650 if the corresponding column switches 638–642 are closed. Row electrodes whose column switches are open are not connected to ON source 650, and thus the corresponding cells of the top row of LCD panel 622 remain off.

When control unit 612 causes row selector 658 to strobe the first row switch 660, thereby causing the least significant bits of the red component for the top row to be displayed on LCD panel 622, it also clears integrator 690 to zero and emits a light-level integration value to register 692. The light-level integration value that is loaded into register 692 when the first row switch 660 is strobed (which can be called "row switch number zero," corresponding to row number zero of LCD panel 622) is one times a predetermined integration increment Δ. Integrator 690 then begins integrating toward the light-level integration value (1×Δ) stored in register 692. The second row of least significant bits for the red component is then shifted into register 636, and when the integrated value from integrator 690 reaches the light-level integration value, comparator 694 emits a signal on line 702 to the control unit 612, which thereupon causes row selector 658 to strobe the second row switch 662 (row switch number one). Cells in the second row of LCD panel 622 are thus turned on in accordance with the least significant bit of the red component. Control unit 612 then updates the light-level integration value in register 692 to two times Δ, shifts the next row of least significant bits of the red component into shift register 636, and so forth. Row-by-row, the cells of LCD panel 622 are thus turned on in accordance with the LSB bits of the red component, with the light-level integration value that is loaded into register 692 being increased in increments of Δ.

After the last row electrode 628 has been strobed, control unit 612 opens switch 652 and closes switch 648, thus connecting OFF source 646 to line 644. Control unit 612 also clears integrator 690 and again loads one times the integration increment Δ into register 692 as the light-level integration value. The first row of least significant bits of the red component is again shifted into shift register 636, and row selector 658 strobes the first row switch 660. This turns off the cells in the top row of LCD panel 622 that were previously turned on. The cells in the top row that were not turned on are left as they were, that is, off. The least significant bits of the red component for the second row are then shifted into register 636, and the second row switch 662 is strobed when the value in integrator 690 reaches one times Δ. This procedure continues until all of the cells in LCD panel 622 that were turned on in accordance with the least significant bits of the red component are turned off in accordance with the least significant bits of the red component. After they have all been turned off, the same amount of light has gone through each of the cells that were turned on and subsequently turned off.

After the LSB bits of the red component have been displayed in this way, the next-to-least significant bits (LSB+1) of the red component is also displayed in the same manner. The illumination unit 676 is still driven at the low level. The difference with respect to the least significant bits is that, after the liquid crystal cells have been turned on in accordance with the LSB+1 bits, they remain on for a "dwell period" that is determined by a light-level integration value that is loaded into register 692 after the last row has been strobed, and then they are turned off in sequence. For LSB+1, the dwell period is set so that the same amount of light passes through the turned-on cells as passes through during the turn-on and turn-off sequences.

The next-least-significant bits of the red component, LSB+2, are displayed in the same manner, with the illumination unit 676 still being driven at the low level. The dwell period is three times larger than the dwell period for LSB+1.

Figure 21:
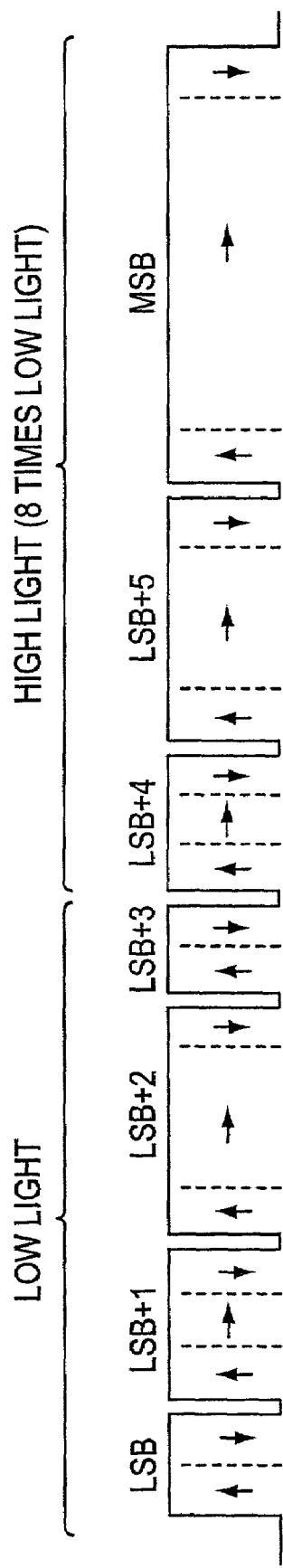
FIG. 21 illustrates turn-on periods, turn-off periods, and dwell periods for different bit ranks and light intensity levels.

After LSB+2 of the red component has been displayed by turning the cells of LCD panel 622 on row-by-row in accordance with LSB+2 and then turning them off row-by-row, control unit 612 emits a one over line 696 to intensity register 670. Driver 672 thereupon begins driving illumination unit 676 at the high level, which is eight times the low level in this example. The cells of LCD panel 622 are then turned on and off in accordance with LSB+3 of the red component. Since the light intensity is now eight times that when the least significant bits were displayed, the dwell period disappears. This is shown in FIG. 21, where upward arrows indicate turn-on periods, downward arrows indicate turn-off periods, and horizontal arrows indicate dwell periods. After LSB+3 has been displayed, LSB+4, LSB+5, and the most significant bit, MSB, are displayed by turning the cells on in accordance with the respective bit rank and then turning them off after appropriate dwell periods.

After all of the bits of the red component have been displayed, the green and blue components are then displayed in the same way. The apparatus is then ready to display the next frame.

Figure 22A:
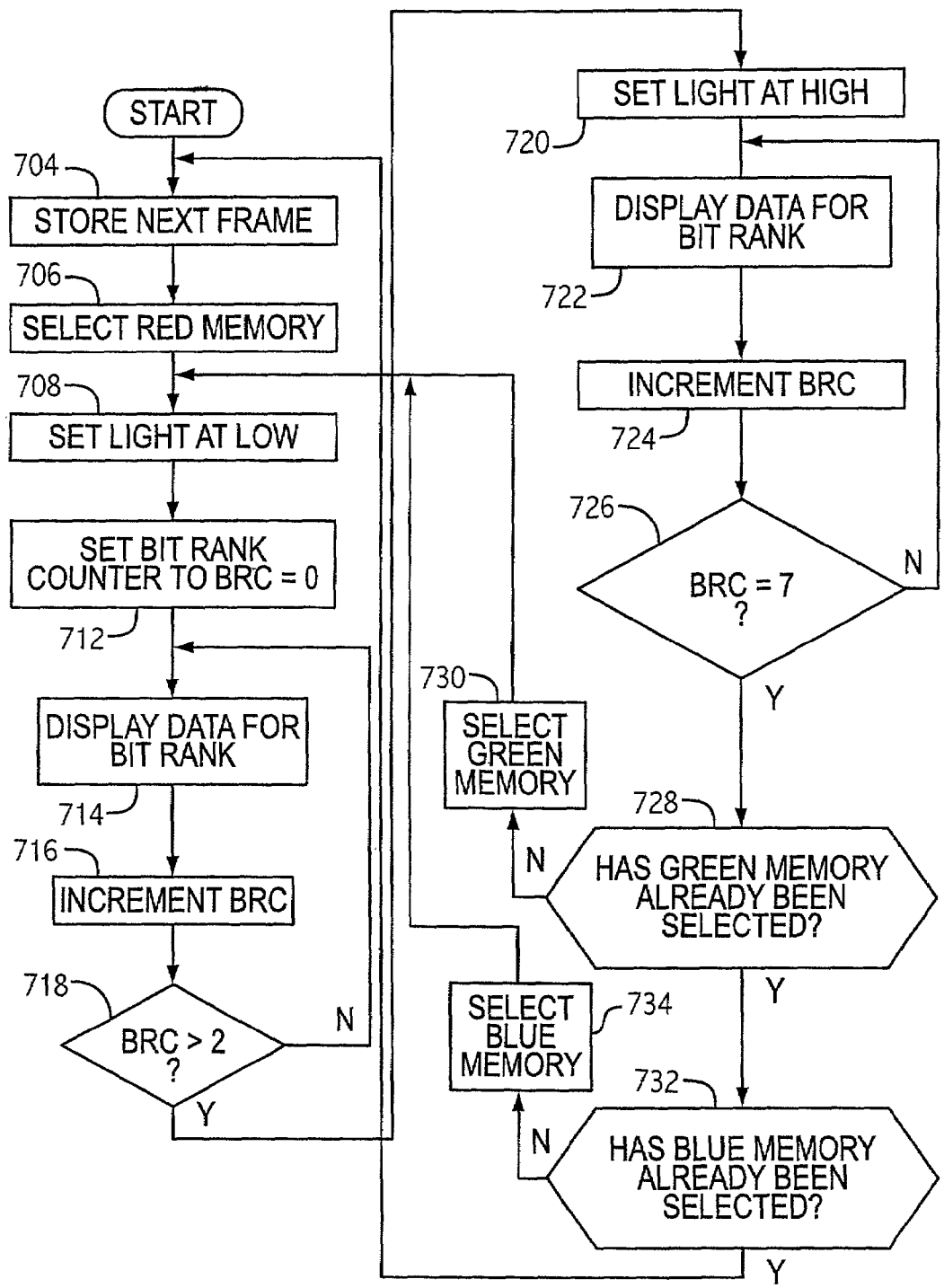
FIG. 22A illustrates a flow chart for operation of the arrangement shown in FIG. 11.

FIG. 22A illustrates the display process described above. In step 704, control unit 612 stores the red, green, and blue components for the next frame in memories 614–618. It then selects red memory 614 in step 706 to supply video data to shift register 636.

In step 708, control unit 612 emits a zero on line 692 to intensity register 670, indicating that driver 672 is to drive illumination unit 676 at the low level. A bit rank counter (not shown) within control unit 612 is then set to zero, indicating the least significant bit, in step 712. The least significant bits of the red component are then displayed on LCD panel 622 in step 714. This will be described in more detail later.

The bit rank counter in control unit 612 is then incremented in step 716. The content of the bit rank counter is then checked, in step 718, to see whether it is greater than two. If not, the process returns to step 714, and the new bit rank of the red component is displayed. If it is determined at step 718 that the content of the bit rank counter is indeed greater than two, control unit 612 emits a one to intensity register 670. In response, driver 672 drives illumination unit 676 at the high level, eight times greater than the low level (step 720). The data for the bit rank is then displayed in step 722, and the bit rank counter is incremented in step 724. Since the most significant bit in this example is equivalent to LSB+6, in step 726 a check is made to determine whether the content of the bit rank counter is now seven. If not, the process returns to step 722 for display of the new bit rank.

When the content of the bit rank counter reaches seven (Y at step 726), a check is made at step 728 to determine whether green memory 616 has already been selected. If not, it is selected in step 730 in lieu of the red memory 614, and the process returns to step 708. If the green memory has already been selected (Y at step 728), a check is made at step 732 to determine whether the blue memory 618 has also been selected. If not, it is selected in step 734, and the process returns to step 706. If the blue memory has indeed already been selected (Y at step 732), the process returns to step 704 for storage of the next frame.

Figure 22B:
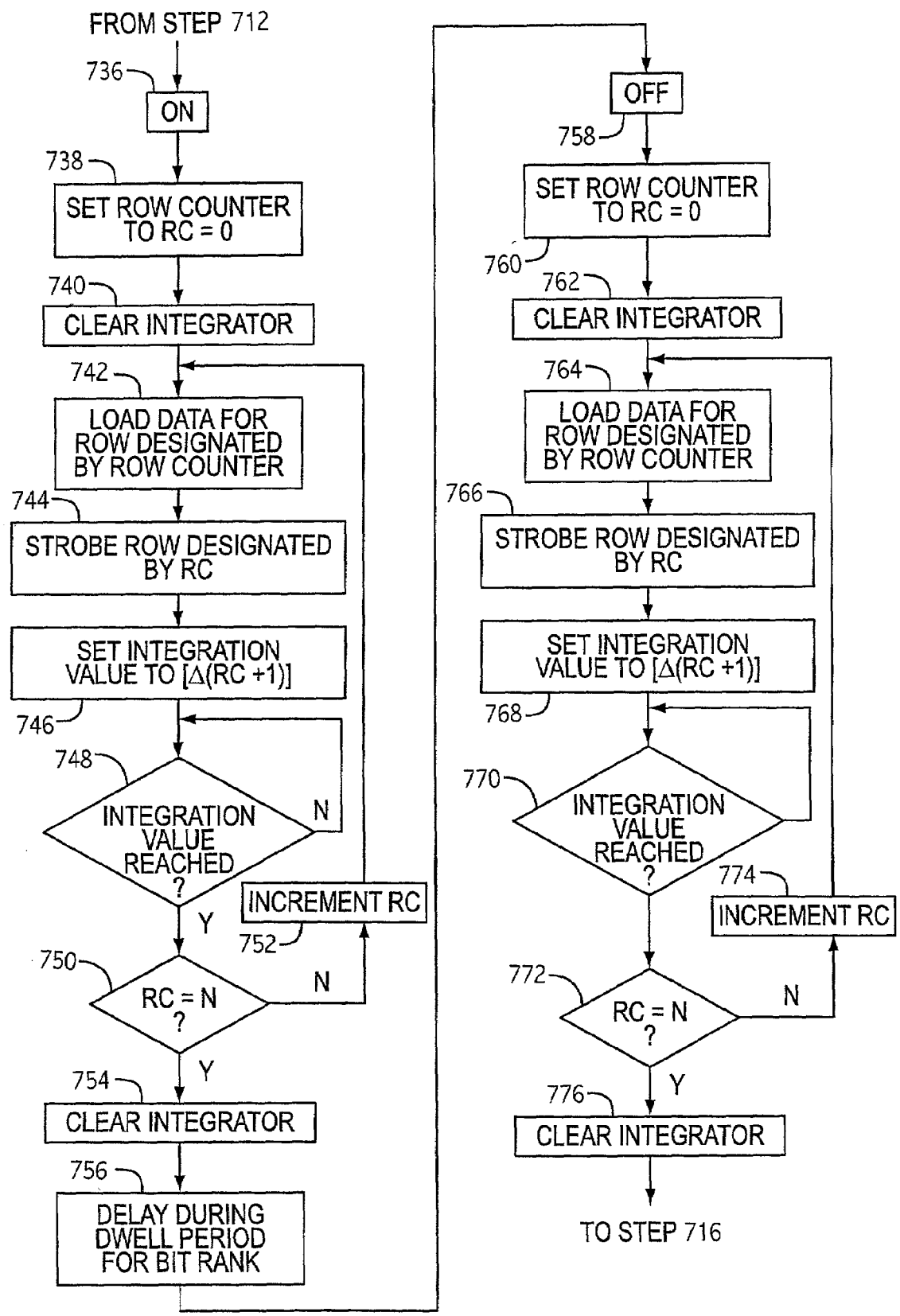
FIG. 22B is a flow chart illustrating one of the steps in FIG. 13A in more detail.

Step 714 for displaying the data of the bit rank is shown in more detail in FIG. 22B. In this Figure, ON source 650 is selected in step 736 by closing switch 652. A row counter (not illustrated) in control unit 612 is set to zero, meaning the first or top row of LCD panel 622, in step 738. Control unit 612 clears integrator 690 to zero in step 740. Data from the bit rank of the selected memory that is designated by the bit rank counter, and the row of that bit rank that is designated by the row counter, is loaded into shift register 636 in step 742. Then control unit 612 causes row selector 658 to strobe the row switch (660–664) that is designated by the bit row counter (step 744). Control unit 612 then transmits a light-level integration value to light-level register 692 in step 746. It determines this integration value by multiplying a predetermined integration increment $\Delta$ by the number of the row designated by the row counter plus one. The light-level integration value after the first row (row number zero) has been strobed is thus one times the integration increment $\Delta$; after the second row (row number one) has been strobed, it is two times the integration increment $\Delta$, and after the last row has been strobed (if LCD panel 622 has N rows, the last one would be row number N−1), it is N$\Delta$.

In step 748, a check is made to determine whether the measured integration value from integrator 690 has reached the light-level integration value stored in register 692. After the integration value has been reached, a check is made at step 750 to determine whether the current content of the row counter is N. Since the last row of LCD panel 622 is designated as row N−1, the decision at step 750 will be no unless the last row of data has already been displayed. If the last row has not been displayed, the row counter is incremented at step 752 and the program returns to step 742.

If the content of the row counter has reached N at step 750, integrator 690 is cleared to zero in step 754. A delay period that is appropriate for the bit rank designated by the bit rank counter then follows in step 756. When the designated bit rank is zero, meaning the least significant bits, the delay during step 756 is zero, as indicated by FIG. 21. From FIG. 21, it will be apparent that the turn-on period (upward arrow), together with the turn-off period (downward arrow) for the least significant bits permit passage of the smallest quantized value of light through the LCD panel 622, as is appropriate for the least significant bits. Consider the top row of LCD panel 622; half of the smallest quantized amount passes through the top row during the turn-on period, and the top row is the first to be turned off during the turn-off period. The total amount of light provided to the top row during the period when it is on is thus equal to the integration increment $\Delta$ times the number N of rows. This same quantity of light is also provided to the second row during the period while it is on, to the third row, and so forth. To double the amount of light that was provided to each row of LCD panel 622 during the period when that row was on, the dwell period for LSB+1 must thus be such that each row receives an amount of light equal to an additional $\Delta$N during the dwell period. Since all of the rows are on simultaneously during the dwell period, the actual time is approximately the same as the turn-on period or the turn-off period, unless the light intensity varies considerably.

Thus, when the bit rank is one, the dwell period of step 752 is provided by loading a light-level integration value that is equal to N times the integration increment $\Delta$ into light-level register 692. Similarly, for LSB+2, the total quantized amount of light provided to the rows of LCD panel 622 while they are on should be equal to four times the total amount of light that was provided to the rows while they were on during the display of the least significant bit. This means that the light-level integration value loaded into register 690 in step 756 when the content of the bit rank counter is 2 is equal to 3$\Delta$N. From FIG. 21, it will be apparent that the dwell period for LSB+3 is zero; the dwell period for LSB+4 is provided by loading $\Delta$N into light-level register 692; the delay period for LSB+5 is provided by loading 3$\Delta$N into register 692; and the delay period for the most significant bit is provided by loading 7$\Delta$N into register 692.

With continuing reference to FIG. 22B, switch 652 (FIG. 20) is opened to disconnect ON source 650 from line 644, and switch 648 is closed to connect OFF source 646 to line 644. This corresponds to off-step 758. Then the row counter in control unit 612 is set to zero in step 760, and integrator 690 is cleared in step 762. Then, from the selected bit rank of the selected memory, the row of data designed by the row counter RC is shifted into shift register 636 during step 764. The row that has just been loaded is strobed during step 766, and the appropriate light-level integration value is transferred to light-level register 692 during step 768. As was the case during the turn-on sequence, the light-level integration value is the product of the integration increment $\Delta$ and the content of the row counter plus 1. When the measured integration value provided by integrator 690 reaches the light-level integration value stored in register 692 (Y in step 770), a check is made at step 772 to determine whether the last row of LCD panel 622, row number N−1, has already been strobed (in which case the content of the row counter will be RC=N). If not, the row counter is incremented in step 7744, and the process returns to step 764. If the content of the row counter is N, however, integrator 690 is cleared at step 776, and the process then proceeds to step 716 (FIG. 22A).

Returning now to FIG. 20, the ON source 650 and the OFF source 646 may simply be DC sources, which provide voltages of opposite polarity, call them "V-ON" and "V-OFF," that are sufficient for turning the liquid crystal cells on and off. A cell that is turned on by connecting it momentarily between ground and V-ON is later turned off by connecting it momentarily between ground and V-OFF. Since V-ON and V-OFF have opposite polarities, the cell is not subjected to long-term exposure to the same polarity, which would be injurious to the LCD panel.

The illumination unit 676 in FIG. 20 includes a plurality of fluorescent lamps for each primary color, the different colors being selected in sequence and the lamps for that color being driven at the same intensity. The intensity is controlled to change between a low level and a high level that is eight times larger. One way that lamp driver 672 can accomplish this is by controlling the duty cycle of the lamps of the selected color. For example, driver 672 would supply pulse-width modulated energy with a long pulse length for the high-level light output, and pulse-width modulated energy with a short pulse length for the low-level light output. In contrast to the illumination unit 676 of FIG. 20, the illumination unit 362 of FIG. 12 includes one lamp that inherently emits a low level of light and another lamp that can be turned on so that, together, the two lamps emit the high level of light.

In both FIGS. 12 and 21, the illumination units emit light at a low level or at a high level that is eight times larger than the low level. Additional levels could be added. For example, a low level, an intermediate level that is four times greater than the low level, and a high level that is sixteen times greater than the low level. It may be inconvenient to do this using lamps that inherently have different output levels, as in FIG. 12. However, in the arrangement of FIG. 21, it will be apparent that the light-intensity command delivered to register 670 could have more than one bit, and the light-intensity value specified by the command could be a binary value designated by these bits.

Another difference between FIGS. 12 and 21 is that color wheel 368 in FIG. 12 provides the sequence of colors, while the lamps with different colors are used in FIG. 21. It will be apparent that a color wheel could be used with white light to back-light the LCD panel 622 of FIG. 21, or lamps with different colors could be used to illuminate the DMD 346 of FIG. 12.

The Twelfth Embodiment

In the eleventh embodiment, the pixels of a spatial light modulator were turned on in accordance with the values of a particular bit rank of the video words, and were then turned off in accordance with the same values before proceeding to a different bit rank. This is useful for an LCD panel, since it protects against degradation of the panel by ensuring that the average voltage across the LCD cells is zero. However, it will be apparent to those skilled in the art that turning the pixels off in accordance with the same values that were used to turn them on, before proceeding to a different bit rank, is not a necessary condition for achieving a constant amount of light through each of the rows of pixels (or, rather, the pixels that are turned on in the rows).

The twelfth embodiment is the same as the eleventh embodiment, except that the pixels are not turned on and then off in accordance with the values of one bit rank and then turned on and then off in accordance with a different bit rank (here, a "different bit rank" will be understood to include any bit rank of the video words for the next frame). In the twelfth embodiment, instead of turning the pixels off row-by-row before proceeding to a different bit rank, the pixels are simply adjusted (on or off) on a row-by-row basis in accordance with the next bit rank. The net result is still a constant amount of light through the pixels that are turned on, for a particular bit rank of the video words for a frame, regardless of the row in which the pixels are disposed.

* * * * *

It will be understood that the above description of the present invention is susceptible to various modifications, changes, and adaptations, and the same are intended to be comprehended within the meaning and range of equivalents of the appended claims.

What is claim is:

1. A method for displaying an image described by video words of a frame, the video words having bits with different bit ranks, said method comprising the steps of:
    (a) for each bit rank, turning pixels of a digital micromirror device on or off in accordance with values of the video words for the respective bit rank; and
    (b) discontinuously exposing the digital micromirror device to brief-duration flashes of light, the flashes having intensities that depend on the respective bit rank,
    wherein step (b) comprises exposing the digital micromirror device to flashes impinging on the digital micromirror device from a first direction, and also to flashes impinging on the digital micromirror device from a second direction, and also to flashes impinging on the digital micromirror device from a third direction.

2. The method of claim 1, wherein some of the flashes are emitted from a red light source, others of the flashes are emitted from a green light source, and still others of the flashes are emitted from a blue light source.

3. A method for displaying a first color component of an image described by video words for the first color component of a frame, the video words having bits with different bit ranks, said method comprising the steps of:
    (a) for each bit rank of the first color component of the frame, turning pixels of a spatial light modulator on or off in accordance with values of the video words of the first color component for the respective bit rank;
    (b) steadily exposing the spatial light modulator to light of the first color component during substantially the entire time that step (a) is conducted, the light being generated by a light source; and
    (c) driving the light source at a first energy level for one of the bit ranks and at a substantially greater second energy level for another of the bit ranks,
    wherein the light source comprises a plurality of light emitters, and
    wherein step (c) comprises turning on less than all of the light emitters to drive the light source at the first energy level and turning on all of the light emitters to drive the light source at the second energy level.

4. The method of claim 3, wherein the spatial light modulator comprises a liquid crystal display.

5. The method of claim 3, wherein the spatial light modulator comprises a digital micromirror device.

6. The method of claim 3, wherein step (c) further comprises detecting light emitted by the light source, integrating the detected light, and changing from the first energy level to the second energy level when the integrated light reaches a predetermined value.

7. A method for displaying a first color component of an image described by video words for the first color component of a frame, the video words having bits with different bit ranks, said method comprising the steps of:
    (a) for each bit rank of the first color component for a plurality of rows of the frame, turning pixels of a spatial light modulator on or off in accordance with values of the video words for the respective bit rank; and
    (b) substantially steadily exposing the spatial light modulator to light that varies substantially in intensity while step (a) is conducted,
    wherein step (b) comprises shining light generated by a light source onto the spatial light modulator, the light source having a plurality of light emitters, and actuating at least one of the light emitters substantially continuously as step (a) is being conducted and turning at least one other of the light emitters on or off as step (a) is being conducted.

8. The method of claim 7, wherein the light has an intensity at one moment that is at least about twice its intensity at another moment.

9. The method of claim 7, wherein the spatial light modulator comprises a liquid crystal display.

10. The method of claim 7, wherein the spatial light modulator comprises a digital micromirror device.

11. The method of claim 7, wherein the first color component is a red component.

12. A method for displaying a first color component of an image described by video words for the first color component of a frame, the video words having bits with different bit ranks, said method comprising the steps of:
(a) for each bit rank of the first color component for a plurality of rows of the frame, turning pixels of a spatial light modulator on or off in accordance with values of the video words for the respective bit rank; and
(b) substantially steadily exposing the spatial light modulator to light that varies substantially in intensity while step (a) is conducted,
wherein step (b) comprises shining light generated by a light source onto the spatial light modulator, detecting the light, integrating the detected light, and changing the intensity of the light generated by the light source when the integrated light reaches a predetermined value.

13. A method for displaying a first color component of an image that is generated by a spatial light modulator having pixels in rows, the first color component of the image being described by video words for the first color component, said method comprising the steps of:
(a) for a first one of the bit ranks of the video words for the first color component, turning pixels in a plurality of the rows of the spatial light modulator on or off in accordance with values of the video words for the first one of the bit ranks;
(b) for a second one of the bit ranks of the video words for the first color component, turning pixels in said plurality of rows of the spatial light modulator on or off in accordance with values of the video words for the second one of the bit ranks; and
(c) steadily exposing the spatial light modulator to light of the first color component while steps (a) and (b) are conducted, the light having an intensity that changes substantially while steps (a) and (b) are being conducted,
wherein step (c) comprises shining light generated by a light source onto the spatial light modulator, the light source having a plurality of light emitters, and actuating at least one of the light emitters substantially continuously as steps (a) and (b) are being conducted and turning at least one other of the light emitters on or off as steps (a) and (b) are being conducted.

14. The method of claim 13, wherein the spatial light modulator comprises a liquid crystal display.

15. The method of claim 13, wherein the spatial light modulator comprises a digital micromirror device.

16. The method of claim 13, wherein the first color component is a red component.

17. The method of claim 13, wherein step (b) comprises shining light generated by a light source onto the spatial light modulator, detecting the light, integrating the detected light, and changing the intensity of the light generated by the light source when the integrated light reaches a predetermined value.

18. A method for displaying a first color component of an image that is generated by a spatial light modulator having pixels in rows, the first color component of the image being described by video words for the first color component, said method comprising the steps of:
(a) shining light of the first color component on the spatial light modulator, the light being generated by a light source;
(b) for a first one of the bit ranks of the video words for the first color component, turning pixels in a plurality of the rows of the spatial light modulator on or off in accordance with values of the video words for the first one of the bit ranks;
(c) detecting light from the light source;
(d) integrating the light detected after step (b) is conducted; and
(e) for a second one of the bit ranks of the video words for the first color component, turning pixels in said plurality of rows of the spatial light modulator on or off in accordance with values of the video words for the second one of the bit ranks when the integrated light reaches a predetermined value.

19. The method of claim 18, further comprising the step of changing the intensity of the light generated by the light source.

20. The method of claim 19, wherein the light source comprises a plurality of light emitters, and the step of changing the intensity comprises actuating at least one of the light emitters steadily and turning at least one other of the light emitters on or off.

21. A method for displaying a sequence of image frames described by video words, the video words having bits with different bit ranks, said method comprising the steps of:
(a) exposing a spatial light modulator to light generated by a light source;
(b) displaying the bit ranks of the video words describing a given frame of the sequence on the spatial light modulator in a predetermined order;
(c) displaying the bit ranks of the video words describing the next frame of the sequence on the spatial light modulator in a different order; and
(d) coloring the light to which the spatial light modulator is exposed with a rotating color wheel,
wherein the predetermined order of step (a) is an ascending order for each color, from least significant bits to most significant bits, and
wherein the different order of step (c) is a descending order for each color, from most significant bits to least significant bits.

22. The method of claim 21, further comprising varying the intensity of the light to which the spatial light modulator is exposed substantially.

23. A method for displaying a first color component of an image described by video words for the first color component of a frame, the video words having bits with different bit ranks, from least significant bits to most significant bits, said method comprising the steps of:
(a) exposing a spatial light modulator to light generated by a light source;
(b) coloring the light to which the spatial light modulator is exposed with a rotating color wheel, the color wheel having at least one segment for the first color component;

(c) displaying the least significant bits and the next-least significant bits of the video words for the first color component on the spatial light modulator during one revolution of the color wheel; and (d) displaying the most significant bits of the video words for the first color component on the spatial light modulator during at least two additional revolutions of the color wheel.

24. A method for displaying a colored image, comprising the steps of:

(a) supplying a first set of data to a digital micromirror device having an array of pivotable micromirrors which have pivot axes, the pivot axes of some of the micromirrors being transverse to the pivot axes of others of the micromirrors;

(b) exposing the digital micromirror device to light of a first color that impinges on the digital micromirror device from a first direction;

(c) supplying a second set of data to the digital micromirror device;

(d) exposing the digital micromirror device to light of a second color that impinges on the digital micromirror device from a second direction;

(e) supplying a third set of data to the digital micromirror device; and (f) exposing the digital micromirror device to light of a third color that impinges on the digital micromirror device from a third direction.

* * * * *